United States Patent
Taghizadeh Motlagh et al.

(10) Patent No.: US 11,870,609 B2
(45) Date of Patent: Jan. 9, 2024

(54) SELECTING A JOINT EQUALIZATION AND DECODING MODEL

(71) Applicant: Lenovo (Singapore) Pte. Ltd., New Tech Park (SG)

(72) Inventors: Seyedomid Taghizadeh Motlagh, Oberursel (DE); Sher Ali Cheema, Ilmenau (DE); Ali Ramadan Ali, Munich (DE); Ankit Bhamri, Rödermark (DE); Hyejung Jung, Northbrook, IL (US); Hossein Bagheri, Urbana, IL (US); Vijay Nangia, Woodridge, IL (US); Razvan-Andrei Stoica, Essen (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/482,148

(22) Filed: Sep. 22, 2021

(65) Prior Publication Data

US 2023/0086078 A1    Mar. 23, 2023

(51) Int. Cl.
*H04L 25/02* (2006.01)
*H04L 1/00* (2006.01)
*H04L 1/06* (2006.01)
*H04L 5/00* (2006.01)
*H04L 25/03* (2006.01)

(52) U.S. Cl.
CPC ........ *H04L 25/0204* (2013.01); *H04L 1/0016* (2013.01); *H04L 1/0643* (2013.01); *H04L 5/0023* (2013.01); *H04L 25/03331* (2013.01)

(58) Field of Classification Search
CPC .................................................. H04L 25/0204
USPC ......................................................... 375/262
See application file for complete search history.

(56) References Cited

U.S. PATENT DOCUMENTS

| | | | |
|---|---|---|---|
| 9,875,440 B1 | 1/2018 | Commons | |
| 2005/0018786 A1* | 1/2005 | Parhi | H04L 25/14 375/265 |
| 2008/0080613 A1* | 4/2008 | Garth | H04L 1/0643 375/234 |
| 2018/0367192 A1 | 12/2018 | O'Shea et al. | |
| 2020/0037360 A1* | 1/2020 | Qian | H04B 7/0695 |
| 2020/0372154 A1* | 11/2020 | Bacher | H04L 41/147 |

(Continued)

OTHER PUBLICATIONS

J. Schmitz et al., "A Deep Learning Wireless Transceiver with Fully Learned Modulation and Synchronization" 2019 IEEE International Conference on Communications Workshops (ICC Workshops), May 2019, pp. 1-6.

(Continued)

*Primary Examiner* — Lihong Yu
(74) *Attorney, Agent, or Firm* — Kunzler Bean & Adamson

(57) ABSTRACT

Apparatuses, methods, and systems are disclosed for supporting JED model selection and training. One apparatus includes a processor and a transceiver that receives a configuration from a network device, said configuration indicating at least one of: a set of resources for model training, a type of intended model training, and combinations thereof. The processor selects a Joint Channel Equalization and Decoding ("JED") model from a set of models based on the received configuration. The processor trains the selected JED model using the received configuration.

20 Claims, 11 Drawing Sheets

(56) References Cited

U.S. PATENT DOCUMENTS

2022/0190990 A1* 6/2022 Zhu .................. G06N 20/00

OTHER PUBLICATIONS

H. Ye et al., Initial Results on Deep Learning for Joint Channel Equalization and Decoding, 2017 IEEE 86th Vehicular Technology Conference (VTC-Fall). IEEE, Sep. 2017, Abstract pp. 1-2.

T. Cui et al., "Iterative Demodulation and Decoding Algorithm for 3GPP/LTE-A MIMO-OFDM Using Distribution Approximation", IEEE transactions on wireless communications, vol. 17, No. 2, Feb. 2018, pp. 1331-1342.

S. Sahin et al., "Iterative Equalization With Decision Feedback Based on Expectation Propagation," IEEE Transactions on Communications, vol. 66, No. 10, pp. 4473-4487, Oct. 2018.

Y. Hu et al., "Joint channel equalization and decoding with one recurrent neural network", 2019 IEEE International Symposium on Broadband Multimedia Systems and Broadcasting (BMSB), Jun. 2019, Abstract pp. 1-2.

W. Xu et al., "Joint Neural Network Equalizer and Decoder", 2018 15th International Symposium on Wireless Communication Systems (ISWCS), Jul. 2018, pp. 1-5.

R.L.G. Cavalcante et al., "Low-complexity distributed set-theoretic decoders for analog fountain codes", Oct. 2018, Abstract pp. 1-2.

3GPP, "3rd Generation Partnership Project; Technical Specification Group Radio Access Network; NR; Physical layer procedures for control (Release 16)", 3GPP TS 38.213 V16.6.0, Jun. 2021, pp. 1-187.

3GPP, "3rd Generation Partnership Project; Technical Specification Group Radio Access Network; NR; Physical layer procedures for data (Release 16)", 3GPP TS 38.214 V16.6.0, Jun. 2021, pp. 1-172.

PCT/IB2022/058995, "Notification of Transmittal of the International Search Report and the Written Opinion of the International Searching Authority, or the Declaration", International Searching Authority, dated Dec. 19, 2022, pp. 1-16.

Narkhede et al., "A review on weight initialization strategies for neutral networks", Artificial Intelligence Review, Springer Netherlands, Jun. 28, 2021, pp. 1-16.

3GPP, "3rd Generation Partnership Project; Technical Specification Group Radio Access Network; NR; Physical channels and modulation (Release 16)", 3GPP TS 38.211 V16.6.0, Jun. 2021, pp. 1-134.

* cited by examiner

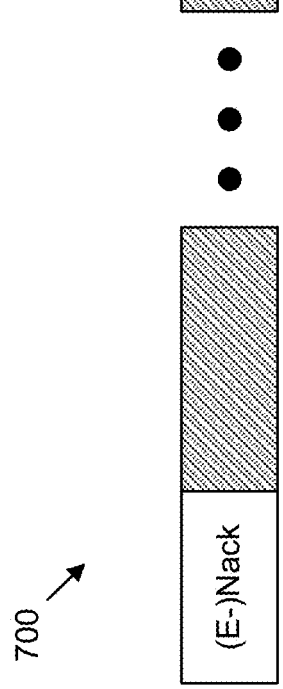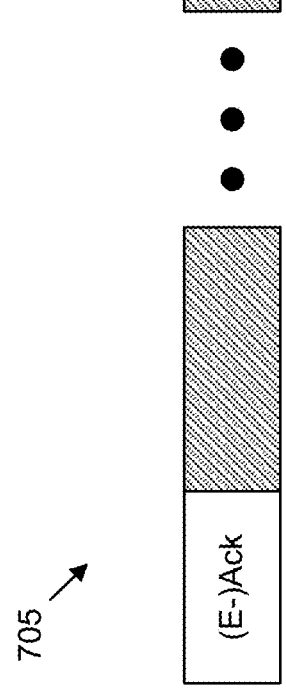

SELECTING A JOINT EQUALIZATION AND DECODING MODEL

FIELD

The subject matter disclosed herein relates generally to wireless communications and more particularly relates to data-aided reception and Channel State Information ("CSI") measurements for Joint Equalization and Decoding ("JED").

BACKGROUND

Previous generations of wireless communication network utilize separate equalization and decoding steps. Equalization refers to mitigating distortion introduced when transmitting a signal through a transmission medium or channel, thereby reducing inter-symbol interference. Decoding refers to translating the received symbol into information.

BRIEF SUMMARY

Disclosed are procedures for supporting JED model selection and training. Said procedures may be implemented by apparatus, systems, methods, or computer program products.

One method of a User Equipment ("UE") for Joint Channel Equalization and Decoding ("JED") model training includes receiving a first configuration from a network device, said first configuration indicating at least one of: a set of resources for model training, a type of intended model training, a type of the model to be used, and some combination thereof. The first method includes selecting a JED model from a set of models based on the received first configuration and training the selected JED model using the first configuration.

One method of a UE for joint link configuration includes receiving a first configuration from a network device, said first configuration indicating: at least one symbol for transmission of a Reference Symbol ("RS") and one symbol for the transmission of data from the network device to the communication device. The second method includes receiving both the RS and data transmission from the network device according to the first configuration and transmitting an indication to the network device indicating feasibility of at least one joint data and RS configuration.

One method of a UE for data-aided Channel State Information ("CSI") measurement and reporting includes receiving a CSI reporting configuration for data-aided CSI measurements from a network device, said CSI reporting configuration including at least one criterion for CSI reporting. The third method includes receiving scheduling information from the network device, said scheduling information comprising a set of channel resources for information transmission. The third method includes receiving a signal on the set of channel resources, decoding the received signal to determine a decoded data sequence, and performing at least one data-aided CSI measurement based on both the received signal and the decoded data sequence. The third method includes determining whether to transmit a CSI report based on the CSI reporting criteria and the at least one data-aided CSI measurement and transmitting the CSI report comprising at least a portion of the at least one data-aided CSI measurement in response to determining to transmit the CSI report.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7A is a diagram illustrating one embodiment of late ACK/NACK feedback send after an initial feedback message;

FIG. 7B is a diagram illustrating another embodiment of late ACK/NACK feedback send after an initial feedback message;

DETAILED DESCRIPTION

Figure 1:
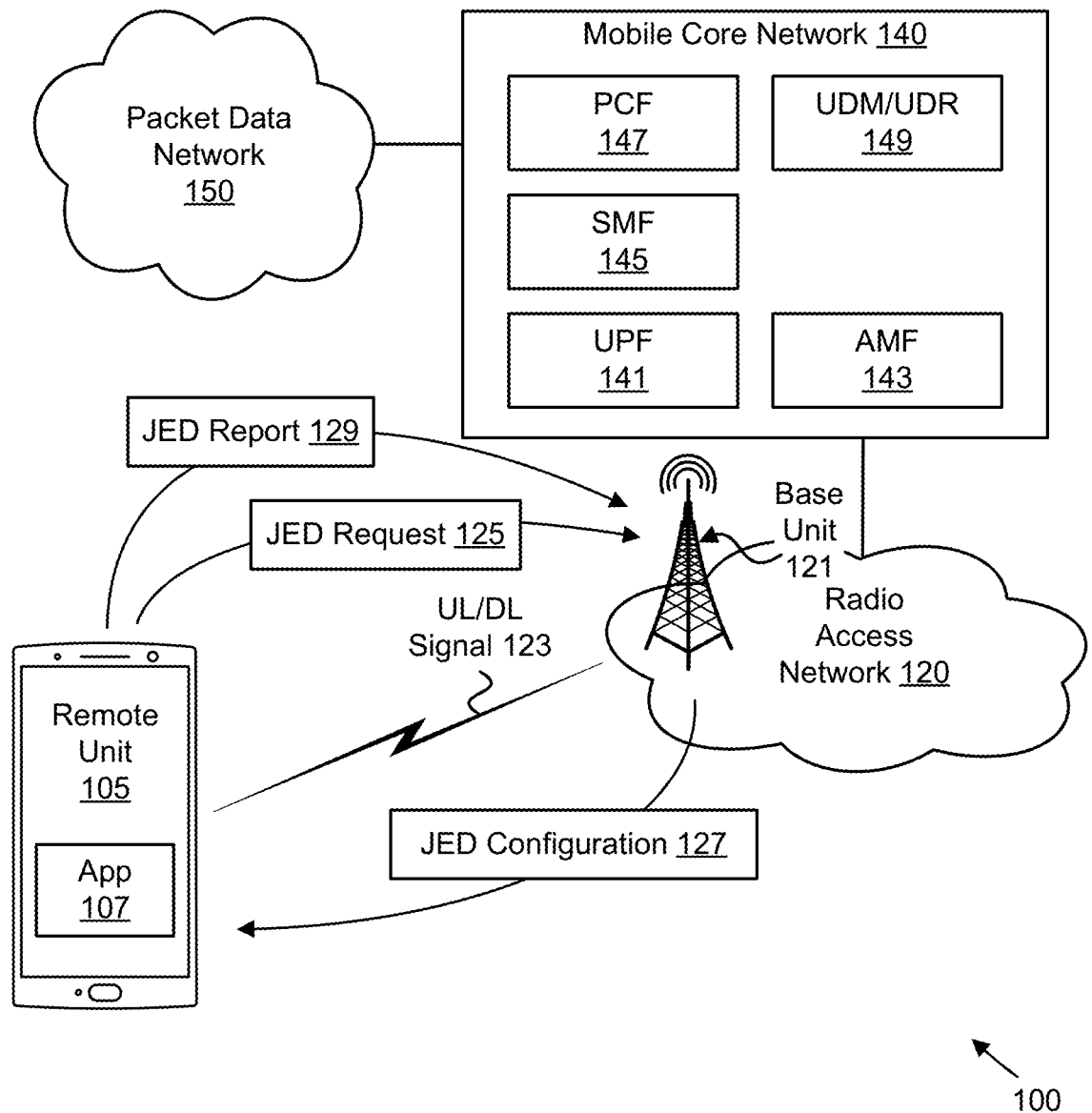
FIG. 1 is a block diagram illustrating one embodiment of a wireless communication system for supporting JED model selection and training.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or } more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for supporting JED model selection and training. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Recent implementations of Artificial Intelligence ("AI")-aided joint channel equalization and decoding ("JED"), where the joint equalization and decoding task is done, e.g., via a trained deep neural network ("DNN") model, have shown improvements over the traditional receiver strategies. It is expected that the observed gains expand as the technology progresses and the concept attracts more attention. Benefits of using the AI-aided models include, firstly, the capability to learn and adapt to the potentially nonlinear and non-Gaussian channel impairments, secondly, by taking advantage of the embedded channel information also in the data phase (together with other reference signals) via joint processing, and thirdly, by enabling the implementation via parallel processing blocks. Note that the latter one is of high significance in coping with large Multiple-In Multiple-Out ("MIMO") and/or high data rate systems operating under latency constraints.

Nevertheless, gainful realization of data-aided JED models requires the implementation and configuration of offline and online training procedures. This is, in part, in contrast to the traditional equalization and decoding schemes mainly relying on expert model-driven designs. On the other hand, implementation of JED receiver leads to an inter-dependent impact of the data configuration as well as the configurations of reference signals used for the purpose of equalization and/or distortion compensation. Furthermore, the employment of the data-aided reception, as a byproduct, also enables advanced Channel State Information ("CSI") measurement and reporting where the decoded data sequence is used for the purpose of, among others, CSI measurements.

Disclosed herein are solutions for the utilization of the data-aided reception and CSI measurements. According to a first solution, signaling and configurations are disclosed to enable offline and online model training for various types of AI-aided JED implementations. According to a second solution, signaling enhancements are disclosed in order to enable the joint configuration of data (e.g., modulation and coding order) and reference signals (e.g., reference signal density/pattern). According to a third solution, procedures and signaling are disclosed to enable data-aided CSI measurements and reporting, utilizing the decoded data sequence.

FIG. 1 depicts a wireless communication system 100 for supporting JED model selection and training, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, RANs 120, base units 121, wireless communication links 123, and mobile core networks 140 are depicted in FIG. 1, one of skill in the art will recognize that any number of remote units 105, RANs 120, base units 121, wireless communication links 123, and mobile core networks 140 may be included in the wireless communication system 100.

In one implementation, the RAN 120 is compliant with the 5G system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a Fifth-Generation Core Network ("5GC") or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM"") and a User Data Repository ("UDR"). Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 143 is responsible for termination of Non-Access Stratum ("NAS") signaling, NAS ciphering & integrity protection, registration management, connection management, mobility management, access authentication and authorization, security context management. The SMF 145 is responsible for session management (i.e., session establishment, modification, release), remote unit (i.e., UE) Internet Protocol ("IP") address allocation & management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for supporting JED model selection and training apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In various embodiments, the remote unit 105 receives a configuration 127 for selecting a joint channel equalization and decoding ("JED") model. In certain embodiments, the configuration 127 is received in response to the remote unit 105 transmitting a JED configuration request 125. As described in greater detail below, the JED configuration 127 may include a set of resources for model training, a type of intended model training, and/or a type of the model to be used. The remote unit 105 selects a JED model based on the received configuration 127 and trains the selected JED model, if a pre-trained JED model is not selected based on the received configuration 127.

In certain embodiments, the remote unit 105 transmits a report 129 relating to one or more known JED models, e.g., according to the received configuration 127. Here, the report 129 may indicate a decoding error rate for the one or more JED models. Using the JED report 129, the network may then refine JED selection parameters/criteria, pre-train JED models, etc.

In the following descriptions, the term "gNB" is used for the base station/base unit, but it is replaceable by any other radio access node, e.g., RAN node, RAN entity, ng-eNB, eNB, Base Station ("BS"), Access Point ("AP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems for supporting JED model selection and training.

Regarding Channel State Information ("CSI") reporting by a remote unit 105, one mechanism for handling CSI reporting feedback for beam management is to use group-based beam reporting. However, due to no association with Transmit/Receive Points ("TRPs"), the benefit is only limited to reduce overhead from feedback point of view and TRP-based beam management cannot benefit much.

According to section 5.2.1.4 of 3GPP TS 38.214 (v16.0.0), following is specified in terms of CSI reporting:

Where the UE is configured with a CSI-ReportConfig with the higher layer parameter reportQuantity set to 'cri-RSRP' or 'ssb-Index-RSRP', if the UE is configured with the higher layer parameter groupBasedBeamReporting set to 'disabled', the UE is not required to update measurements for more than 64 CSI Reference Signal ("CSI-RS") and/or Synchronization Signal Block ("SSB") resources, and the UE is to report in a single report nrofReportedRS (higher layer configured) different CSI-RS Resource Index ("CRI") or Synchronization Signal Block Resource Index ("SSBRI") for each report setting. Here, "RSRP" refers to the reference signal ("RS") received power.

Otherwise, if the UE is configured with the higher layer parameter groupBasedBeamReporting set to 'enabled', the UE is not required to update measurements for more than 64 CSI-RS and/or SSB resources, and the UE it to report in a single reporting instance two different CRI or SSBRI for each report setting, where CSI-RS and/or SSB resources can be received simultaneously by the UE either with a single spatial domain receive filter, or with multiple simultaneous spatial domain receive filters.

Where the UE is configured with a CSI-ReportConfig with the higher layer parameter reportQuantity set to 'cri-SINR' or 'ssb-Index-SINR', if the UE is configured with the higher layer parameter groupBasedBeamReporting set to 'disabled', then the UE is to report (in a single report) nrofReportedRSForSINR (higher layer configured) different CRI or SSBRI for each report setting. Otherwise, if the UE is configured with the higher layer parameter groupBasedBeamReporting set to 'enabled', then the UE is to report in a single reporting instance two different CRI or SSBRI for each report setting, where CSI-RS and/or SSB resources can be received simultaneously by the UE either with a single spatial domain receive filter, or with multiple simultaneous spatial domain receive filters.

Regarding Channel Quality Indicator ("CQI") feedback, conventional behavior is specified in 3GPP TS 38.214 (v16.0.0), the contents of which are hereby incorporated by reference. Specifically, the UE is to derive for each CQI value reported in uplink slot n the highest CQI index which satisfies the following condition:

A single Physical Downlink Shared Channel ("PDSCH") transport block with a combination of modulation scheme, target code rate and transport block size corresponding to the CQI index, and occupying a group of downlink physical resource blocks termed the CSI reference resource, could be received with a transport block error probability not exceeding: A) 0.1, if the higher layer parameter cqi-Table in CSI-ReportConfig configures 'table1' (corresponding to Table 5.2.2.1-2), or 'table2' (corresponding to Table 5.2.2.1-3), or B) 0.00001, if the higher layer parameter cqi-Table in CSI-ReportConfig configures 'table3' (corresponding to Table 5.2.2.1-4).

Figure 2:
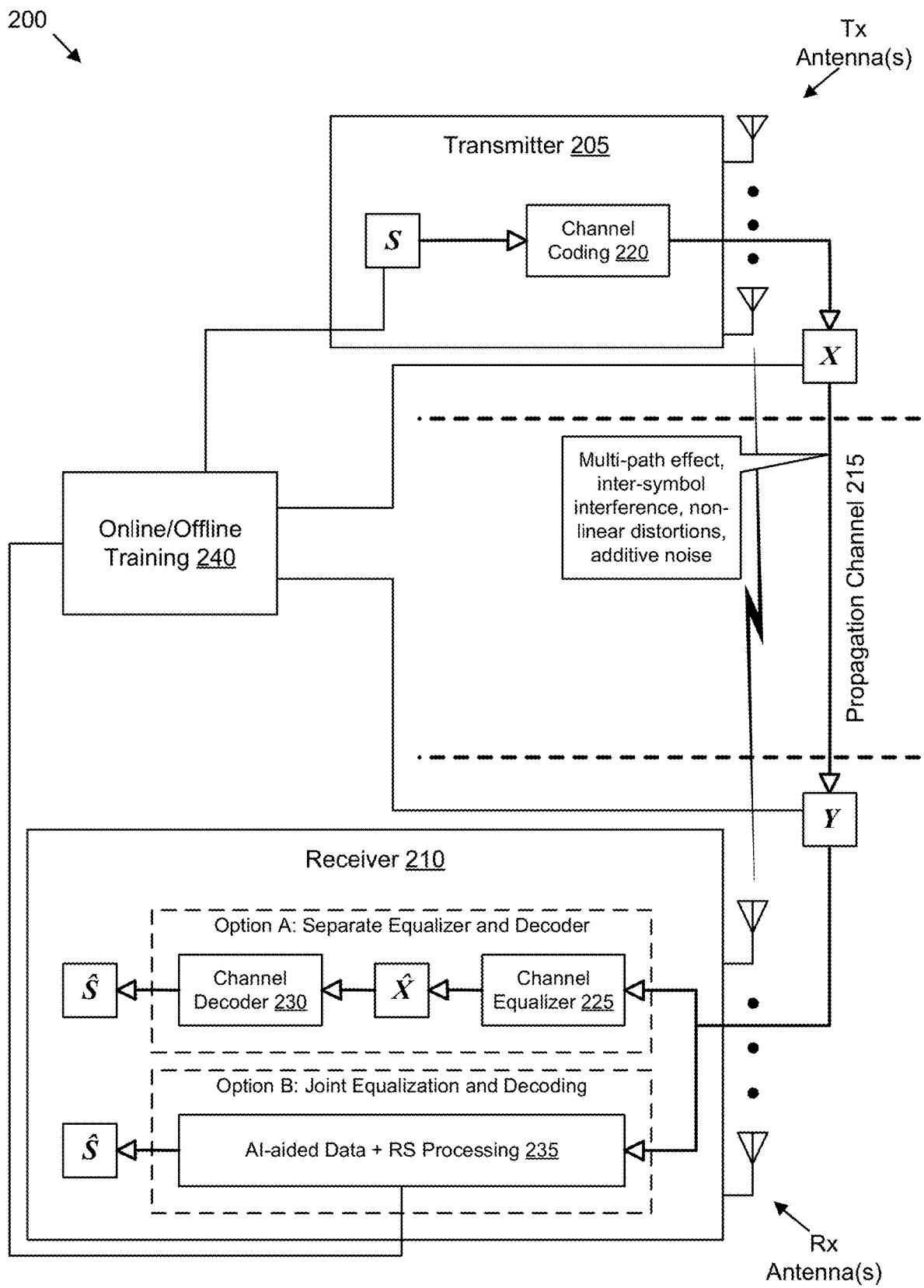
FIG. 2 is a diagram illustrating one embodiment of a transmission and reception chain.

FIG. 2 depicts a high-level schematic for a transmission and reception chain 200, according to embodiments of the disclosure. The transmission and reception chain 200 includes a transmitter 205 which transmits a signal (i.e., symbol sequence) to a receiver 210 via a propagation channel 215. In one embodiment, the transmitter 205 is one embodiment of the base unit 121 and the receiver 210 is one embodiment of the remote unit 105. Alternatively, the remote unit 105 may be the transmitter 205 and the receiver 210 may be another node in a mobile communication network, such as the base unit 121 or another remote unit 105.

In the depicted embodiment, the transmission and reception chain 200 includes a channel encoding block 220 at the transmitter 205. Here, the transmitter 205 performs channel coding on the source-coded data symbol sequence S, thereby deriving channel-coded data symbol sequence X. The transmitter 205 uses one or more transmit ("Tx") antennas/antenna ports to transmits the channel-coded data symbol sequence X via the propagation channel 215. The symbol sequence that arrives at the receiver 210 via the propagation channel 215 is the represented here as sequence Y. Note that the propagation channel 215 introduces multi-path effect, inter-symbol interferences, non-linear distortions, additive noise, or combinations thereof to the transmitted signal.

In some embodiments, the receiver 210 implements separate channel equalization and decoding, indicated by Option A. Here, the receiver 210 includes a channel equalization block 225 which attempts to reverse the effects of the propagation channel 215, thereby deriving the estimated data symbol sequence $\hat{X}$. The sequence $\hat{X}$ is processed by the channel decoder block 230 to generate the recovered data symbol sequence $\hat{S}$.

In other embodiments, the receiver 210 implements joint channel equalization and decoding ("JED"), indicated by Option B. Here, the receiver 210 includes an AI-aided Data and Reference Signal ("RS") processing block 235 which used a JED model to derive the recovered data symbol sequence $\hat{S}$ directly from the sequence Y. In various embodiments, the AI-aided processing block 235 (also referred to as "JED block") is trained via a combination of offline and online procedures, represented by block 240.

The receiver strategy of Option A represents a receiver concept where the steps of channel equalization and decoding are done separately. In contrast, the receiver strategy of Option B represents the case where the tasks associated with equalization and decoding are performed jointly. In the latter case, the JED can be implemented via a learned/optimized non-linear process, e.g., via iterative equalization and soft-decoding or deep neural network ("DNN"), or non-linear kernel-based processing.

The main training task of the JED block 235 can be done offline, with a priori known channel statistics and encoding structure. Nevertheless, the used offline model is to be also augmented with an online learning phase to adjust the JED block 235 to the non-linear distortions and instantaneous channel effects, as described in greater detail below.

In DNN-based JED implementations, it is observed that the DNN-based schemes obtain a smaller decoding error in comparison to the benchmarks based on Gaussian Process Classification ("GPC") and iterative minimum mean square error ("MMSE") and soft-decoding baselines for the scenarios of a) dispersive channel with non-linear distortions, e.g., introducing notable Inter-Symbol Interference ("ISI") effects, and b) the case of a frequency selective and time-varying channel, for different values of Signal-to-Noise Ratio ("SNR") and/or Signal-to-Interferences-and-Noise Ratio ("SINR").

In particular, the utilization of the novel AI-aided JED schemes is expected to be gainful in three aspects. While the majority of the developments in coding theory relies on the Gaussian assumption of the distortions, i.e., an Additive White Gaussian Noise ("AWGN") channel model, this assumption does not hold true in reality where predominantly non-linear and non-Gaussian distortions, both from channel and also from the Radio Frequency ("RF") chains, are present. In this regard, the capability of the methods from adaptive (non-linear) learning theory enable further adjustments to an arbitrary statistic of the distortions, which is proven to be gainful.

Additionally, the transmitted and received data sequence, excluding the reference signals, contain significant information regarding the nature of the channel and the required demodulation process. The prior examples of such schemes are available, e.g., as decision-feedback equalization methods. In this respect, a learning-based JED scheme can take advantage of the channel/link information embedded in the received signal in the data phase, in order to improve the overall equalization and decoding performance.

Further, the recent implementation of DNN-based JED and kernel-based decoding schemes enable parallel implementation of the required processing task, which is a significant feature to enable high dimension (e.g., MIMO) and high data-rate equalization and decoding within a required set of latency constraints. Moreover, the fast calculation of each non-linear block (e.g., each neuron or each kernel-based projection) leads to a reduced processing latency.

This disclosure enables and enhances the utilization of data-aided joint equalization and decoding, in the general context of wireless communication networks as well as data-aided CSI measurements, via the following solutions:

A first solution describes signaling and configuration enhancements to facilitate various implementations of AI-aided Joint Equalization and Decoding ("JED") model trainings, including signaling to enable online JED model training, offline (pre-trained) JED model selection, and end-to-end autoencoder-JED training.

A second solution describes enhanced signaling and configuration to facilitate joint configuration of the data and various reference signals.

A third solution described enhanced data-aided CSI measurements and reporting, where the decoded data sequence is utilized to generate enhanced CSI measurements. This includes the configuration of the data-aided measurements and reporting, as well as the signaling to obtain online (real-time) UE capability.

In contrast to the traditional expert/model-based designs, AI-aided JED directly employ data for the purpose of model training. While AI-aided JED models report a promising gain by jointly adapting to various coding, hardware and channel impairment effects, they rely on training periods to achieve the desired performance. The model training can be divided into an offline training phase and an online training phase, each phase posing different signaling requirements and overhead.

The offline training phase adjusts the model to the a priori-known and almost-static parameters including, e.g., the approximate impairments and channel statistics, the type of encoding strategy as well as the transceiver setup (e.g., number of antennas), whereas the online training phase adapts the JED model to the instantaneous channel and link conditions. Furthermore, in addition to the JED model, an end-to-end training phase may be implemented to enable an end-to-end autoencoder and decoder operation, thus enabling a full-cycle learning-based transmission and reception processing.

According to embodiments of the first solution, the below described signaling enhancements facilitate various implementations of AI-aided JED model trainings.

In some embodiments, a UE is required to report its capability in terms of supporting AI-aided JED and corresponding models that it is capable of applying. Based on the reported capability by UE, network can configure the UE accordingly to apply AI-aided JED as described in following embodiments.

According to a first embodiment of the first solution, online training periods are configured by the gNB for the purpose of online JED model training at the UE.

In some embodiments, a gNB configures the UE with a dedicated resource with the purpose of online model training. In one embodiment, the configuration for the dedicated model training is done dynamically, e.g., via Downlink Control Information ("DCI") or Medium Access Control ("MAC") Control Element ("CE"). In another embodiment, the configuration for the dedicated model training is done semi-persistently, e.g., via Radio Resource Control ("RRC") signaling. In further embodiments, the configuration for dedicated model training may be accomplished with both dynamic and semi-persistent resource allocation.

In certain embodiments, the configuration for the dedicated model training can be done individually for each user. In other embodiments, the configuration for dedicated model training may be done via group configurations, where multiple UEs (capable of AI-aided JED) can be simultaneously configured to perform the online model training task.

For example, group configuration may be selected for the situation where at least two users (UEs) are closely located, or can be served via a same beam and the DL training data can be viewed as a broadcast channel (i.e., the multiple UE can receive the same data sequence and train their JED model on that basis). Additionally, the actual data communication may be performed in dedicated (not grouped) resources, e.g., via Time-Division Duplexing ("TDD").

In another implementation, a network entity, e.g., gNB, configures a group of UEs with a group-common reference signal resource for CSI measurements and/or online model training for demodulation/decoding. Here, the configuration information may be sent via broadcast signaling (e.g., via system information ("SI") message) or via a group-common RRC message scheduled by DCI with Cyclic Redundancy Check ("CRC") scrambled by a group-common Radio Network Temporary Identifier ("RNTI").

Here, each UE in the group may refine its model by using the group-common reference signal resource. Additionally, a UE may use a unicast PDSCH intended to the UE for online model training. The reference signal resource for online training may be a semi-persistent resource with activation/deactivation indicated by DCI with CRC scrambled by the group-common RNTI. The group of UEs may further be configured with a group-specific Physical Uplink Control Channel ("PUCCH") resource (e.g., a Scheduling Request ("SR") resource) to request activation of the group-common reference signal resource for online model re-training.

In some embodiments, the configuration of a dedicated model training resources can be triggered by the UE. In some implementations, the gNB may configure the UE with a performance indicator, e.g., a threshold on the decoding error rate, or maximum processing time for obtaining the correct decoded sequence (in case of iterative JED models), upon which the UE is to request a configuration for dedicated online training.

In some embodiments, the online training phase may include periods of data transmissions, however, with some restrictions on transmission strategy, including a) the coding rate and modulation order, b) the portion of the known training sequence combined with the data, or c) some combination thereof. To support JED model training the data transmission is to be restricted such that it is decodable at the receiver, and thereby usable for data-aided training at the UE to enable data transmission also during the training phase.

In some embodiments, the nature of the training phase is indicated to the UE by the gNB, e.g., via DCI signaling. In some embodiments, the gNB sends configuration on the nature of the data aided-training phase, including the period and portion of data and training sequence transmission and the data configuration (e.g., coding rate and modulation order). In some embodiments, during an online model training phase or in response to requesting a training phase by the UE, the UE may utilize conventional (i.e., non-AI aided) receiver(s) for demodulating and decoding the received data transmissions, i.e., the UE is not expected to receive data transmissions only using an AI-aided receiver.

In some embodiments, during an online model training phase the UE may operate with a first UE capability (e.g., conventional receiver, low UE processing time capability, conventional requirements on reference signals etc.), and during a trained-model phase the UE may operate with a second UE capability (e.g., AI-aided receiver, higher UE processing time capability, reduced requirements on reference signals etc.).

In some embodiments, the gNB may configure the UE to perform online training by storing and running the online training using the successfully decoded data sequence. In some implementations, the gNB may configure the communication at a smaller rate (e.g., by adding redundancy, repetition, employing a smaller coding rate/efficiency) or with periods of pause (e.g., gaps or time-periods for data processing), to enable the UE for the required processing time.

In some implementations, the UE indicates to the gNB the maximum data rate and latency that it can use for simultaneously decoding the data and running the online model training. For example, the UE is not expected to perform simultaneous data decoding and running online model training for TB (transport block) sizes larger or smaller than a threshold, where the threshold can be reported via a UE capability signaling.

In some implementations, the gNB may configure the UE with a reception quality threshold, e.g., average output DNN model accuracy with respect to the desired output (can be measured in terms of, e.g., sum distance/norm/cross-entropy to the desired output value as loss/cost function) during the training phase or decoding success statistics, to end the online training phase, and subsequently notify the gNB of the end of online training phase. In some embodiments, the UE may report an indication of the reception quality or loss function value (e.g., based on a training set or validation/test set) to the gNB to aid the gNB to end the training phase.

Upon receiving an indication of the end of training phase from the UE, in some embodiments, the gNB may terminate the transmission of training sequence and/or relax transmission restrictions during the training phase, and start the usual data transmission phase, e.g., PDSCH transmission.

In some embodiment, the gNB may pause the data transmission to allow UE with required processing for online training. An example is when the gNB allows UE with some extra processing time so that the UE can repeat the same training phase (e.g., with different hyperparameters or model configuration) to obtain a better trained model, without imposing burden on the gNB. In some embodiments, the time duration of the pause can be indicated by the UE, or dynamically indicated by the gNB, e.g., via DCI signaling.

The occurrence and the duration of the pause may be requested/triggered by the UE. In some embodiments, the UE is configured to indicate the end of online model training period once some conditions are satisfied. In some embodiments, the gNB is to continue the usual transmission without further delay.

In some implementations, the UE may indicate a time reference from which the data reception/decoding has not been performed due to the training delay. In an example, the UE which is configured/enabled to perform simultaneous data decoding and running online model training is configured with a second dl-DataToUL-ACK (List of timing for given PDSCH to the DL ACK, e.g., as defined in TS 38.213, clause 9.1.2) that is different than a first dl-DataToUL-ACK when the UE is not configured/enabled to perform simultaneous data decoding and running online model training.

In another example, the UE may be configured with a training delay offset and may determine the PDSCH-to-HARQ_feedback timing value based on the training delay offset and the dl-DataToUL-ACK (e.g., combine, add) when the UE is configured/enabled to perform simultaneous data decoding and running online model training. In yet another example, the UE which is configured/enabled to perform simultaneous data decoding and running online model training is not expected to be indicated a PDSCH-to-HARQ_feedback timing value in a scheduling DCI that is smaller than a threshold, wherein the threshold can be reported via a UE capability signaling.

In some embodiments, when the measured error (e.g., distance/norm/cross-entropy of the DNN output to the desired output value as loss/cost function (e.g., based on a training set or validation/test set)) is below a certain threshold or some other condition is met (during the online training), or when the pre-trained model is selected (during the offline training), the UE is configured to stop the online (or also offline) training phase and send an training end indication e.g., training termination flag to the gNB.

In certain embodiments, the termination flag is sent together with the achieved level of error or additional information on the current state of the training, e.g., the achieved training/validation error/accuracy, average training/validation error/accuracy within a configured window of time, a compressed/quantized/down-sampled sequence of the achieved error within a configured window of time, or a combination thereof. In an example, the termination flag may be multiplexed with HARQ-ACK.

In some embodiments, the UE will resume the training also after the termination criteria is met and indicated to the gNB. In an example, the UE resumes the training till a specific time after sending the termination flag. In some implementations, the UE waits for a termination acknowledgment from the gNB to stop the measurement and recording process. In some implementations the indication of a termination flag is repeated periodically while the termination is not agreed to, or termination acknowledgment is not received from the side of the gNB.

In some implementations training period is configured dynamically via DCI signaling, or semi statically via RRC. In some implementations, the DCI signaling is used for activation and termination of such training and reporting periods.

In some implementations, the loss/cost function, the training period, reporting period are associated with different priority level corresponding to the traffic and/or device type. In one implementation, when the device is configured/indicated with high priority traffic (e.g., URLLC traffic), then the loss/cost function value is much more stringent.

The reporting and training time is associated with the latency target of the traffic/device type. In an example, the UE does not run online model training for traffic associated with a certain priority/latency and/or reliability requirement (e.g., for URLLC traffic). In some implementations, the UE may select/be configured with a first model configuration (or first set of hyper-parameters) for a first priority traffic (e.g., high priority) and a second model configuration (or second set of hyperparameters) for a second priority traffic (e.g., normal priority). The first model configuration may be based on (e.g., optimized for) a first set of conditions (e.g., one or more of limit on maximum modulation (e.g., 64-Quadrature amplitude modulation ("QAM")), lower spectral efficiency Channel Quality Indicator/Modulation and Coding Scheme ("CQI/MCS") table, low maximum rank/number of transmission layers (e.g., max 2 layers), lower target Block Error Rate ("BLER") (0.1%)), relative to the second model configuration based on a second set of conditions (e.g., one or more of maximum modulation (e.g., 256-QAM), higher spectral efficiency CQI/MCS table, high maximum rank/number of layers (e.g., max 4/8 layers), higher target BLER (10%)). Accordingly, there may be different models optimized for different situations, e.g., when the channel rank/transmission layers is within a specific region.

In some embodiments, the UE is configured to store a trained model when it satisfies a configured quality criterion. In some embodiments, the UE is configured to store and notify the gNB on the newly stored model, or store and transfer a compressed version of the stored model parameters to the gNB, or some combinations thereof.

In some implementations, the aforementioned procedure is to be initiated by gNB. In some implementations, the UE receives a configuration to decide when to trigger the aforementioned store-and-report procedure on the used model. In some implementations, the store-and-report procedure is initiated by the UE if the performance of the JED satisfies a certain threshold and the trained model is sufficiently novel (via some pre-defined measure of distance, e.g., Euclidian distance of the (e.g., stacked) model parameters) compared to the already stored model.

Figure 3:
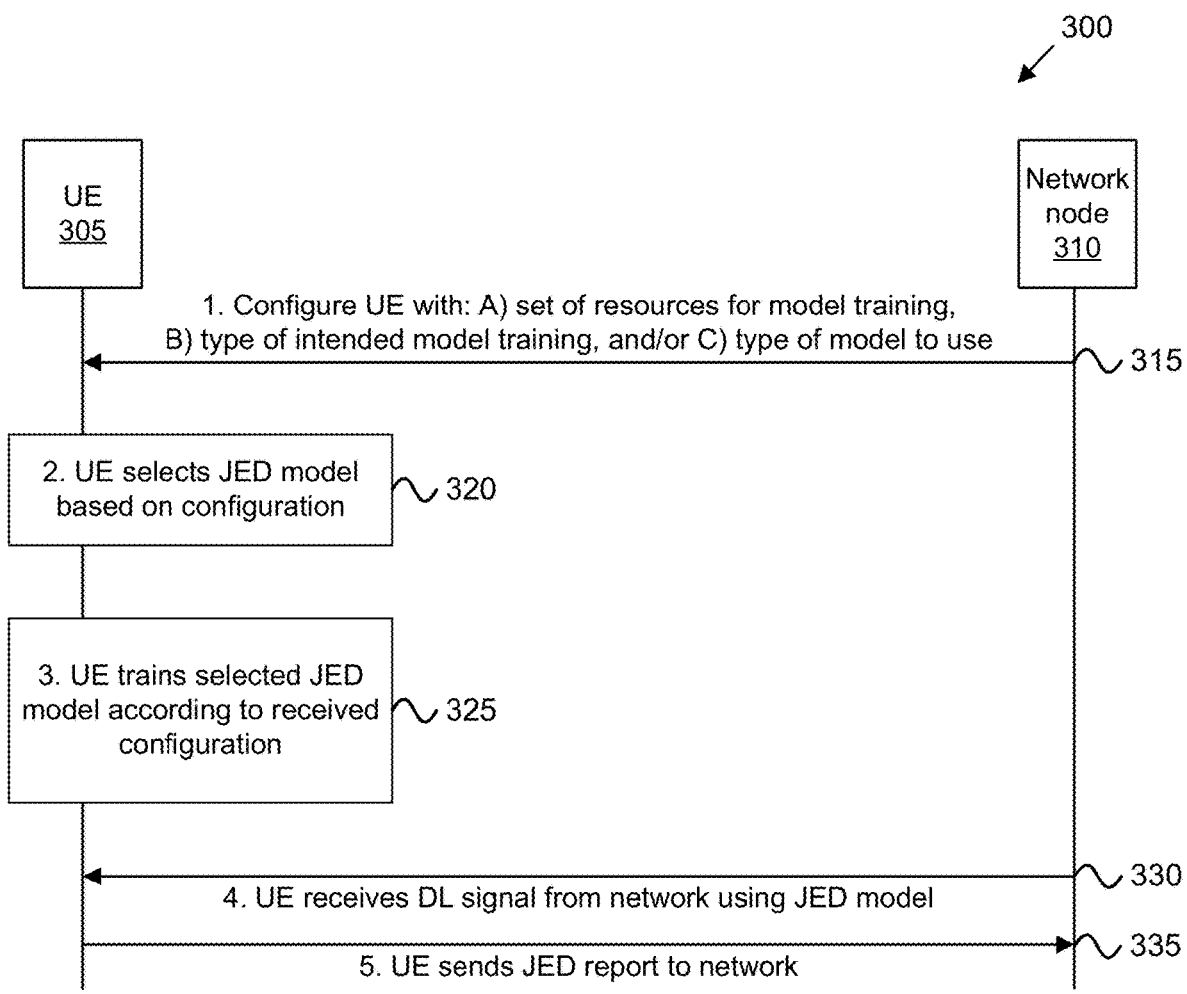
FIG. 3 is a call-flow diagram illustrating one embodiment of a procedure for AI-aided Joint Equalization and Decoding ("JED") model adjustment.

FIG. 3 depicts a procedure 300 for configuring a JED model training resource, according to embodiments of the disclosure. The procedure 300 involves a UE 305 and a network node 310, such as a gNB. The UE 305 may be one embodiment of the remote unit 105, while the network node 310 may be one embodiment of the base unit 121.

At Step 1, the UE 305 may receive a configuration from the network node 310 containing A) set of resources for model training, B) type of intended model training, and/or C) type of model to use (see messaging 315). At Step 2, the UE 305 then selects a JED model based on the configuration (see block 320). At Step 3, the UE trains the selected JED model according to the received configuration (see block 325).

In various embodiments, at Step 4, the UE 305 receives one or more DL signals from the network using the JED model (see messaging 330). In certain embodiments, these DL signals are received during the online training phase and are used to train the selected JED model. In other embodiments, one or more DL signals may be received after training the JED model, wherein the JED model is used to jointly perform channel equalization and decoding, as described herein. In certain embodiments, at Step 5, the UE 305 transmits a JED report to the network (see messaging 335). As described in greater detail below, the JED report may include JED model performance and/or measurements configured in Step 1.

According to a second embodiment of the first solution the gNB may configure the UE such that a pre-trained (i.e., offline) JED model can be selected/employed at the UE.

In some implementations, the gNB utilizes knowledge of UE capabilities and the list of available models at the UE and recommends/configures the UE with an index indicating the choice of the pre-trained JED model. In some implementations, the gNB may transmit a compressed version of the selected pre-trained model to the UE.

In some implementations, the procedure of obtaining the compressed pre-trained model and/or the model codebook recommendation/configuration is initiated with a request from the UE. In some implementations, the UE request also includes additional information regarding UE capability and the available model codebook and the currently employed model and the performance of the currently employed model or some combinations thereof.

In some implementations, the gNB configures the communicating UEs to report on the employed JED models and the respective performance. The obtained JED model reports are then used to recommend a pre-selected model to a new user. In some implementations, the pre-trained JED models can be exchanged directly between the UEs via Sidelink ("SL") channels that are capable of supported AI-aided JED.

In some implementations, a UE may be indicated to choose the pre-trained JED model with no further input from the gNB. In this case, the UE may re-run the available models on the communicated data stream to decide on the chosen model. In some implementations, the gNB may indicate a previously stored model during the communication with the same user to be chosen as the pre-trained model.

In some implementations, the gNB sends an input configuration to the UE including, e.g., information on the used encoding strategy, the channel statistics including delay and doppler spread, average pathloss, average and/or standard deviation ("stdev") SNR and SINR, Mean-CQI and stdev-CQI, CQI corresponding to the worst 'M' sub-bands in a time duration, CSI based on worst IMR (interference measurement resource) occasion in a time duration, or some combination thereof. Here, the input configuration indicates that the UE is to select the pre-trained model based on the information contained in the input configuration. In some implementations, an index representing an entry from a configuration table can be communicated. An example of the configuration table is given as following:

TABLE 1

Example input configuration table for pre-trained model selection.

| Index | Max delay spread | Avg. delay spread | Max doppler spread | Avg. doppler spread | Pathloss | Avg. SINR | Coding index (type/rate) |
|---|---|---|---|---|---|---|---|
| 0 | 0.2-0.5 [μsec] | 0.1-0.3 [μsec] | 300-500 [Hz] | 100-200 [Hz] | 85-105 [dB] | 10-20 [dB] | 3 |
| 1 | 0.2-0.5 [μsec] | 0.1-0.3 [μsec] | 300-500 [Hz] | 100-200 [Hz] | 85-105 [dB] | 5-10 [dB] | 2 |
| ... | | | | | | | |

The UE then decides on the employed JED model from the received index value. In some implementations, the procedure of obtaining the index or the input configuration data can be initiated with a request from the UE. In some embodiments, the Table 1 may include only a subset of parameter fields.

In some implementations, the gNB will pause the data transmission (or some other DL transmissions, such as Physical Downlink Control Channel ("PDCCH")) to accommodate the UE with required processing/training/model selection. In some implementations, the UE is configured to indicate the end of model training/selection period, in some implementations, the gNB is to continue the usual transmission without delay.

In some implementations, the UE will indicate a time reference from which the data reception has not been done due to the training delay. In an example, the UE is indicated a time duration, in which certain communication with gNB is paused/not performed to allow for processing/training/model selection.

In an example, training/model selection is associated with a number of processing units (such as the CSI processing unit defined in TS 38.214), and while the UE is reached its maximum processing units ("PUs"), no further task (such as CSI computation) is performed till the UE releases some processing units. In another example, the UE performs training/model selection only if there is a certain number of processing units (or CSI processing units as defined in TS 38.214) is available.

In some implementations, a dedicated training period can be configured by the gNB, where the UE is to select the initial pre-trained model by examining it on the received training sequence. In some implementations, the joint dedicated training as well as the input configuration information is to be used by the UE to choose the pre-trained model. In some implementations, the procedure of obtaining a dedicated training period and/or the input configuration data can be initiated with a request from the UE.

Apart from the scenarios where AI-enabled JED models are used, the communication link may also take advantage of the full transmission-reception model training, where, e.g., a DNN-based autoencoder and (potentially) a JED model is employed. In such scenario, the gNB may utilize a specific training phase for the implemented autoencoder model.

According to a third embodiment of the first solution, the gNB configures the UE to enable training of the encoding/transmission model by performing and reporting additional model measurements. In some embodiments, the gNB configures the UE to store a subset of model output values during a specified reception period. In some embodiments the measurement configuration is combined with configuration on the measurements reporting, depending on the implemented model.

Figure 4:
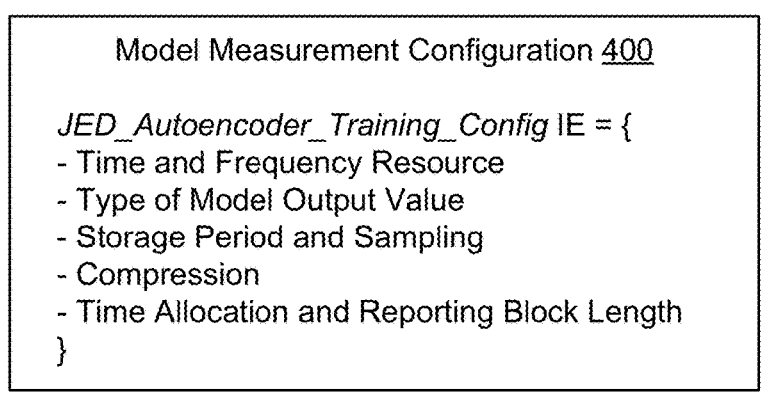
FIG. 4 is a diagram illustrating one embodiment of a model measurement configuration.

FIG. 4 depicts an example of a model measurement configuration 400, according to embodiments of the disclosure. In various embodiments, the configuration 400 includes a JED_Autoencoder_Training_Config information element ("IE") with one or more of the following fields/parameters:

The field/parameter "time and frequency resource" may be used to indicate for which the model performance is to be recorded. The field/parameter "type of model output value" may be used to indicate a type of model output value to be stored (e.g., the output value by which the loss/cost/error function can be constructed compared to a desired output).

The field/parameter "storage period and sampling" may be used to indicate a measurement storage period and sampling (in case only a subset of the output values is to be stored). The field/parameter "compression" may be used to indicate a type of quantization/compression that may be performed on the stored measurements before transmission to the transmitter. The field/parameter "time allocation and reporting block length" may be used to indicate reporting time allocation and time-frequency training block for reporting length (number of measured samples in each reporting) periodicity and time allocation for the measurements reporting.

In some implementations, the gNB may configure the UE to feedback the residual error immediately, via a dedicated available UL resource. In some embodiments, the UE is configured to employ a pre-known receiver strategy which remains fixed during the training, i.e., with no update of the model parameters. In some embodiment, UE is configured to neglect part of the measurements once some condition, the stored data exceeds a threshold, the channel SINR reaches above or below a threshold, the measured error is below a certain threshold, or some combinations thereof.

In some embodiments, when the measured error is below a certain threshold, the UE is configured to stop the measurements and send an indication. e.g., a termination flag. In some embodiments, the UE will resume measurement and recording also after the termination criteria is met and indicated to the gNB. In some implementations, the UE waits from a termination acknowledgment from the gNB to stop the measurement and recording process. In some implementations the indication of a termination flag is repeated periodically while the termination is not agreed from the side of gNB. In some implementations training period is configured dynamically via DCI signaling, or semi statically via RRC. In some implementations, the DCI signaling is used for activation and termination of such training and reporting periods.

In some embodiments, the gNB configures the UE with additional time or frequency resource or a reduced DL data rate, in order to accommodate the additional processing associated with the measurements and reporting.

According to embodiments of the second solution, enhanced signaling is enabled to facilitate the joint configuration of the data and various reference signals. Due to the possibility for simultaneous utilization of reference signals, e.g., Demodulation Reference Signal ("DM-RS"), Phase Tracking Reference Signal ("PT-RS"), CSI-RS, as well as the data for the purpose of joint equalization and decoding ("JED"), a joint link configuration of data and various reference signals is required.

Figure 5:
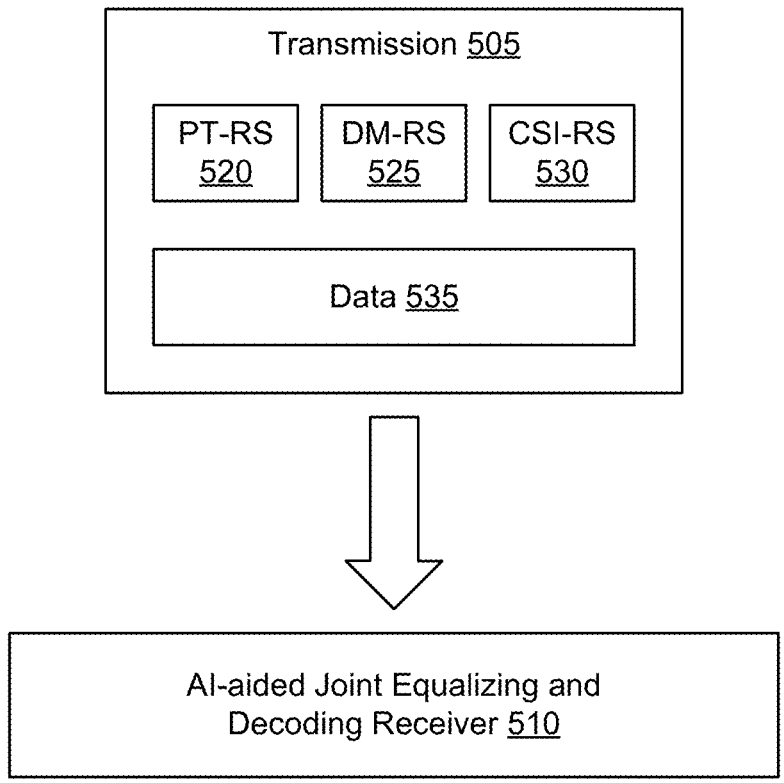
FIG. 5 is a diagram illustrating one embodiment of an AI-aided JED receiver simultaneously utilizing data and different reference signals for JED.

FIG. 5 depicts a high-level schematic 500 of an AI-aided JED receiver 510 where various reference signals together are utilized simultaneously with the data 535. A transmitter prepares a transmission 505 which contains PT-RS 520, DM-RS 525, CSI-RS 530 and data 535. Upon receiving the transmission 505, the AI-aided JED receiver 510 simultaneously utilizes the data 535 and the reference signals 520, 525, 530 for joint equalization and decoding.

According to a first embodiment of the second solution, the CQI-MCS table is extended to jointly reflect on the Modulation and Coding Scheme ("MCS") as well as the Reference Signal ("RS") configurations, e.g., PT-RS, DM-RS density. Examples of conventional CQI-MCS tables include Table 5.2.2.1-2, Table 5.2.2.1-3, and 5.2.2.1-4 of 3GPP TS 38.214 (v16.0.0), which are hereby incorporated by reference. In various embodiments, the higher layer parameter cqi-Table in CSI-ReportConfig IE configures which CQI-MCS table applies. In some embodiment, the UE indicates to the gNB the possible reduction of DM-RS density, PT-RS density, a new joint configuration of DM-RS and PT-RS, or a combination thereof.

In some embodiments, the UE is configured to run the JED multiple times, each time with a subset of the received PT-RS and/or DM-RS symbols, e.g., use different DM-RS densities to observe the impact on the JED process (e.g., decoding quality, loss function metric). The measured JED report is then signaled back to the gNB. The reporting by the UE may include a history of the resulting measurements.

Figure 6:
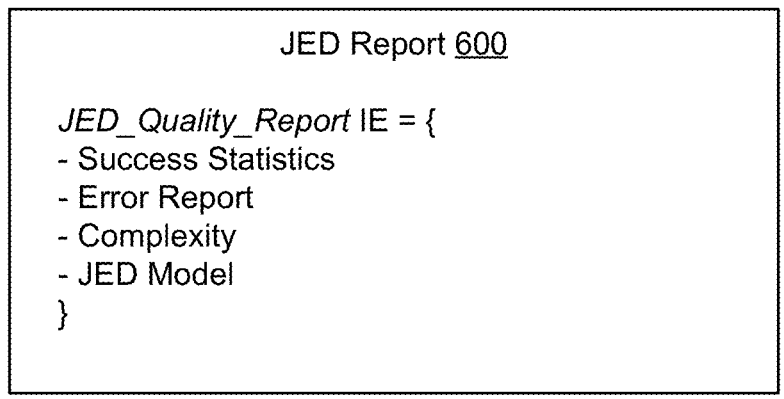
FIG. 6 is a diagram illustrating one embodiment of JED report.

FIG. 6 depicts an example of a JED report 600, according to embodiments of the disclosure. In various embodiments, the configuration 400 includes a JED_Quality_Report information element ("IE") with one or more of the following fields/parameters:

The field/parameter "Success statistics" may be used to indicate decoding success statistics: e.g., average success rate of the certain JED strategy with a given RS density/configuration, or statistics regarding decoding margin (e.g., how many MCS units/indices the UE is above/below a decoding threshold).

The field/parameter "error report" may be used to indicate a quantized version of the resulting (real) error value, e.g., from the output stage of an employed DNN model or a function (e.g., average sum, norm, etc.) of the error values.

The field/parameter "complexity" may be used to indicate the decoding processing complexity, e.g., number of expired iterations until successful decoding or decoding failure determination or the number of the employed parallel processing cores, number of DNN layers or layer width (number of neurons/activations), type of DNN layers, number of weights, number of trainable parameters, ratio of trainable parameters to non-trainable parameters, or some combinations thereof, The field/parameter "JED Model" may be used to indicate the used JED model by which the resulting measurements is obtained. For example, when the UE reports the quality of different pre-trained models to the gNB, or when the UE reports the impact of changing a subset of DNN JED model parameters.

In some embodiments, the UE transmits an index to the gNB representing a feasible joint configuration of MCS and the reference signals. An example of the extended table is given in Table 2.

TABLE 2

Example for joint MCS-RS configuration

| Extended CQI (E-CQI) index | Modulation | Coding rate × 1024 | DM-RS pattern index (time/frequency density) | PT-RS pattern index (time/frequency density) |
|---|---|---|---|---|
| 1 | Quadrature Phase Shift Keying ("QPSK") | 78 | 0 | 0 |
| 2 | QPSK | 120 | 0 | 0 |
| 3 | QPSK | 130 | 1 | 1 |
| 4 | 16QPSK | 378 | 0 | 0 |
| ... | | | | |

In some embodiments, the configuration of the UE by the gNB is based on the prior knowledge of a UE capability and available processing and memory resources. In some embodiments, the UE is configured to perform the measurements at a specified time in a future or at a time when the processing resources become available. In some embodiments, the processing and/or reporting by the UE is triggered by the UE without prior configuration or request from the gNB.

In some embodiments, the UE may indicate multiple indices to define a feasible range for decoding and RS density configurations. In some embodiments, the communicated indices may also accompany a priority index, processing complexity indicator, the resulting error value (e.g., measured from the DNN network output layer), or a combination thereof.

In some embodiments, the Table 2 is updated depending on the observed prior statistics, the configuration information in Table 1, the employed JED model updates, or a combination thereof.

In some embodiments, the indication by the UE may be done incrementally, by indicating an increase/decrease in a subset of features, e.g., a certain increase in coding rate together with a certain increase in DM-RS density. In some embodiments, the UE may indicate a range of possible indices or a range of incremental indications. In some embodiments, the indication may be done only on a part of the information fields in Table 2, e.g., a set of feasible DM-RS densities and the associated coding success rate and processing complexity or a combination thereof may be reported.

In some embodiments, the gNB may configure the UE with a JED timing constraint. In some embodiments, when the UE employs an iterative JED strategy, the gNB may indicate a maximum number of iterations for the JED process, or the range for which the feasible configurations, e.g., from Table 2, is to be evaluated (or the evaluation reports from JED_report_fields), or some combinations thereof. In some embodiments, the gNB will indicate a maximum processing latency (and/or the number of parallel processing cores) to the UE by which a feasible tolerable latency range for the JED process is indicated, or by which the feasible configurations, e.g., from Table 2, is to be evaluated.

In some embodiments, the UE is configured to dynamically report its capability. An example online capability report may include, e.g., the available battery storage, the UE willingness/interest to perform additional voluntary tasks, the available (free) memory, the available (free) processing power, or some combinations thereof. The capability report may be configured to be done periodically, dynamically upon request of the gNB, or event-triggered e.g., any time that a certain condition is met, e.g., when the UE is willing to perform additional reporting, has sufficient memory and processing power and energy storage (beyond some threshold or, e.g., is not operating in a power saving, micro-sleep, and/or Discontinuous Reception ("DRX") mode), enjoys a minimum SINR condition, or some combinations thereof.

In some embodiments, the related configurations can be done dynamically via DCI or via RRC signaling. Furthermore, the related configurations may be done for a specific UE or a group of UE, or a group of UE that satisfy a specific condition (e.g., memory, processing power availability). In some embodiments, the related measurements and reporting can be triggered by UE and/or can be done without explicit configuration from the gNB.

According to a second embodiment of the second solution, Ack/Nack feedback may be extended to also include additional information on the JED process. In particular, Extended Ack, Extended Nack, Late Ack and Late Nack are defined to report an instance of JED success or failure, in combination with additional related Ack/Nack information:

Extended A (also referred to as "augmented Ack/Nack") indicates the success/failure of the JED process with additional information regarding the employed JED setup, e.g., index of the employed JED model, maximum number of iterations in case of iterative JEDs, the used density of RS or some combinations thereof.

Late Ack/Nack (also referred to as "supplemental Ack/Nack") indicates the success/failure of the JED process on the same block of data (e.g., code-block/code-block group/ transport block) for which an initial Ack/Nack (e.g., NACK) has been previously reported, with additional information regarding the employed JED setup, e.g., employed JED model, maximum number of iterations in case of iterative JEDs, the used density of RS, a measure of error obtained from the DNN JED or a combination thereof.

Note that the usage of the Late Ack/Nack is two-folds: firstly, in case of an initial NACK, the repetition of the JED on the same block but with different model configuration (allowing a higher number of iterations or utilizing an expanded model with more layers/parallel blocks) may lead to a successful decoding, which eliminates the retransmission if it is indicated in time. Secondly, the additional tries with different JED configurations will assist gNB for choosing a proper joint data and RS configurations for the subsequent transmissions.

FIGS. 7A-7B depict feasible combinations of the extended Ack/Nack feedback for the same coding block (and hence, the same HARQ process). FIG. 7A depicts a first scenario 700 of extended and supplemental feedback, according to embodiments of the disclosure. As depicted, after an initial Nack (or an initial extended Nack) feedback, the instances of JED success/failure are reported with different JED input configurations, e.g, reduced RS densities or extended/reduced maximum processing time/capability, which constitute L-Ack/L-Nack feedbacks.

FIG. 7B depicts a second scenario 705 of extended and supplemental feedback, according to embodiments of the disclosure. As depicted, after an initial Ack (or an initial extended Ack) feedback, the instances of JED success/failure are reported with different JED input configurations, e.g, reduced RS densities or extended/reduced maximum processing time/capability, which constitute L-Ack/L-Nack feedbacks.

In some embodiments, an Extended Ack (E-Ack) or an Extended Nack (E-Nack) is transmitted instead of traditional Ack/Nack in order to indicate JED success/failure specific to a HARQ process together with additional information on the result of the performed JED. Furthermore, late Ack (L-Ack) and late Nack (L-Nack) are transmitted to report an instance of JED success/failure, as a result of evaluating JED process on the same data but with alternate configurations. In some embodiments, the resulting instances of the L-Ack/L-Nack and/or E-Ack/E-Nack feedbacks are reported together with additional information on the JED process, e.g., similar to the information contained in JED_quality_report, described above with reference to FIG. 6. In some embodiments, the resulting instances of the L-Ack/L-Nack feedbacks are reported in a single feedback report.

In some embodiments, the dedication of time/frequency communication resources and related configurations to L-Ack/L-Nack and/or E-Ack/E-Nack feedbacks can be done dynamically via DCI or via RRC signaling. Furthermore, the related configurations may be done for a specific UE or a group of UE, or a group of UE that satisfy a specific condition (e.g., memory, processing power availability, and active communication resources). In some embodiments, the related measurements and reporting can be triggered by UE and/or can be done without explicit configuration from the gNB.

In particular embodiments, the UE may reject particular gNB configuration requests related to measurements and reporting depending on the instantaneous capabilities and resources available. In an example, the HARQ-ACK is extended in some of the HARQ-ACK instances. In an example, the UE is configured to report the extended information once every 'x' units of time (e.g., slots) e.g., in an instance of HARQ-ACK, if any, at the boundary of every 'x' time units. In an example, a separate HARQ codebook is used for the extended HARQ-ACK (e.g., subslot length for the extended and non-extended HARQ-ACKs can be different). As used herein, "HARQ-ACK" may represent collectively the Positive Acknowledge ("ACK") and the Negative Acknowledge ("NACK") and Discontinuous Transmission ("DTX"). ACK means that a Transport Block ("TB")/packet is correctly received while NACK (or NAK) means a TB/packet is erroneously received and DTX means that no TB/packet was detected.

According to embodiments of the third solution, enhanced data-aided CSI measurements and reporting are supported, where the decoded data sequence is utilized to generate enhanced CSI measurements.

Figure 8:
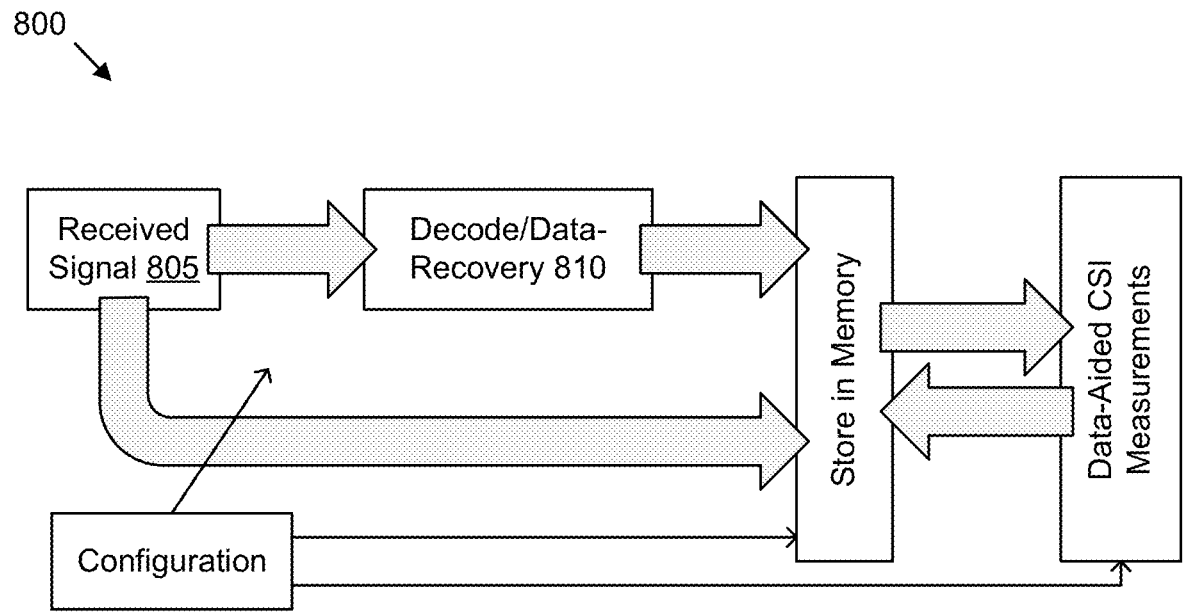
FIG. 8 is a diagram illustrating one embodiment of processing steps and configurations related co data-aided CSI measurements.

FIG. 8 depicts a procedure 800 of the processing steps and configurations related to data-aided CSI measurements. The procedure 800 may be performed by a receiver/communication device, such as the receiver 210.

At Step 1, the received signal 805 at the antenna ports, or a down-sampled version of the received data at the antenna ports or a compressed version of the received signal waveform from the antenna ports or a combination thereof is stored in the receiver device memory.

At Step 2, the data sequence 810 is decoded and successfully verified at the receiver.

At Step 3, if the data sequence is not verified (e.g., via CRC), the data sequence is ignored, and the corresponding received signal (from step 1) is removed from the memory.

At Step 4, the verified data sequence, or a down-sampled version of the decoded data sequence, or a compressed version of the decoded data sequence or a combination thereof is stored in the receiver device memory.

At Step 5, the stored data sequence as well as the stored received signal at the antenna ports are then used for the purpose of CSI measurements. Additionally, the obtained measurements are reported to the gNB.

In some embodiments, portions of some of the steps such as data sequence storage in receiver device memory may be skipped. In some embodiments, the gNB may configure the device with a time window or an expiration time beyond which the stored values of data and/or compressed received signals is to be neglected/deleted from the memory. In some examples, the time window/expiration time may be based on the channel coherence time or Doppler characteristics of the channel. In some embodiments, the UE may be configured to further down-sample/compress the stored data and received signal related to a time older than a configured threshold.

In some embodiments, the UE is configured to report the difference between the data-aided measurements and measurements based on the available RS signals. In some embodiments, UE is requested to report the difference if it exceeds a certain threshold.

In some embodiments, the UE is configured to store and keep the received signal in the memory, also when the data CRC check is not verified, or when the re-transmission of the same data block is done due to repetition coding. In both cases, the UE is to employ the CRC-checked decoded data sequence for all repetition periods to observe the channel fluctuations with a higher accuracy. In some embodiments, the UE may keep only a subset of the repetition blocks in the memory, e.g., via a sampling with a pre-configured ratio and/or via a configured condition, e.g., for those transmission blocks that satisfy some SINR threshold.

In one implementation, UE is configured/indicated to receive multiple repetitions of the same data block and if the data block on one of the repetition is received correctly that is not the last repetition, then the decoded data can be used to measure the channel fluctuation on all the following repetitions of the same data block.

In some embodiments, the UE is requested to evaluate/measure the impact of DM-RS bundling, via the observation of the channel fluctuations. The bundling evaluation can be configured to entail different densities of RS signals (e.g., DM-RS, PT-RS, etc.) as well as different time window, e.g., the number of bundling slots to be evaluated.

In some embodiments, the UE is configured to perform data-aided CSI measurements via a computational model (e.g., a separate DNN model for inferring specific channel behavior), where the (compressed/quantized) model parameters are communicated or indicated to the UE.

In some embodiments, the UE is configured to perform data-aided CSI measurements on multiple receive antenna ports (to obtain extended interference measurements from different antenna ports or beams), even when the same beam/antenna port is not dedicated for the performed communication. In some embodiments, the gNB configures the UE to perform data-aided CSI measurements.

Figure 9:
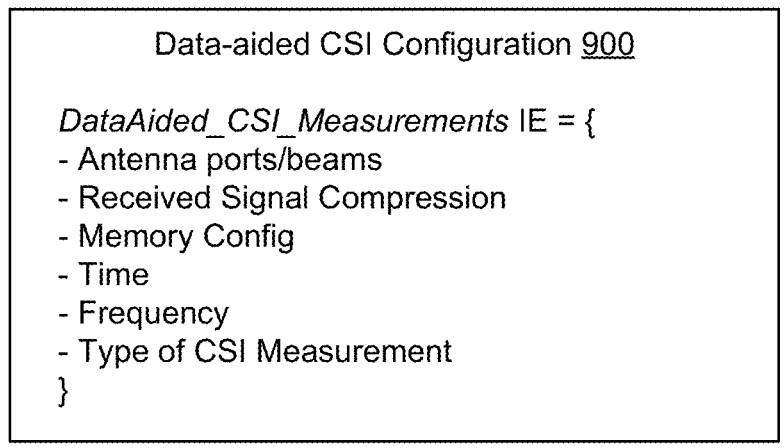
FIG. 9 is a diagram illustrating one embodiment of a Data-aided CSI measurement configuration.

FIG. 9 depicts an example of a CSI measurement configuration 900, according to embodiments of the disclosure. In various embodiments, the configuration 400 includes a DataAided_CSI_Measurements information element ("IE") with one or more of the following fields/parameters:

The field/parameter "Antenna ports/beams for received signal storage" may be used to indicate one or multiple receiver antenna ports for which the received signal is to be stored.

The field/parameter "Received signal compression" may be used to indicate the type of signal compression to be done, e.g., {quantization bits, down-sampling ratio, compression type, etc.}.

The field/parameter "Memory config" may be used to indicate the size of the memory to store the signal and data, the maximum time to keep a data/signal before expiration and deletion from the memory.

The field/parameter "time" may be used to indicate the time-domain symbols or coding blocks for which the corresponding measurements is to be done.

The field/parameter "frequency" may be used to indicate the frequency domain resources for which the corresponding CSI measurements is to be done.

The field/parameter "Type of CSI measurement" may be used to indicate the type of CSI measurements to be done, e.g., {interference level measurement, beam measurement channel statistics, sufficiency of RS signal density, a measure of channel variation, or a computational model (e.g., a DNN model) to be indicated or transferred to the UE}.

In some embodiments, the gNB may configure the UE with some conditions, e.g., a desired SINK threshold, availability of free memory, and processing power and battery or a combination thereof, on which the UE is requested to perform data-aided CSI measurements. In some embodiments, the related configurations for CSI measurements can be done dynamically via DCI or via RRC signaling. Furthermore, the related configurations may be done for a specific UE or a group of UE, or a group of UE that satisfy a specific condition (e.g., memory, processing power availability).

In some embodiments, the related measurements and reporting can be triggered (e.g., based on an event-trigger) by UE and/or can be done without explicit configuration from the gNB. The measurement reports can be configured to be done periodically, via the request of gNB (gNB-triggered), gNB configured (i.e., with a dedicated communication resource), or UE-triggered.

In some embodiments, the measurements report can be configured to be done after each measurement is concluded or once the measurement satisfies a certain condition, e.g., a difference threshold with a previously reported related measurement (e.g., on interference variance at an antenna port) is passed, if the measurement report indicates a necessary change in the link configuration (e.g., change of RS signal density).

In some embodiments, the data-aided CSI measurements may be performed on block chunks of the signal where individual chunks of coded transmissions and their corresponding CRCs are placed in a sequence forming thus the entire signal of interest. Such blocks may be then leveraged to finely track both the statistics of JED performance per chunk given the chunk's individual CRC, and respectively, track more effectively CSI fast fading statistics per chunk basis via the data-aided CSI acquisition enhancement procedure.

Figure 10:
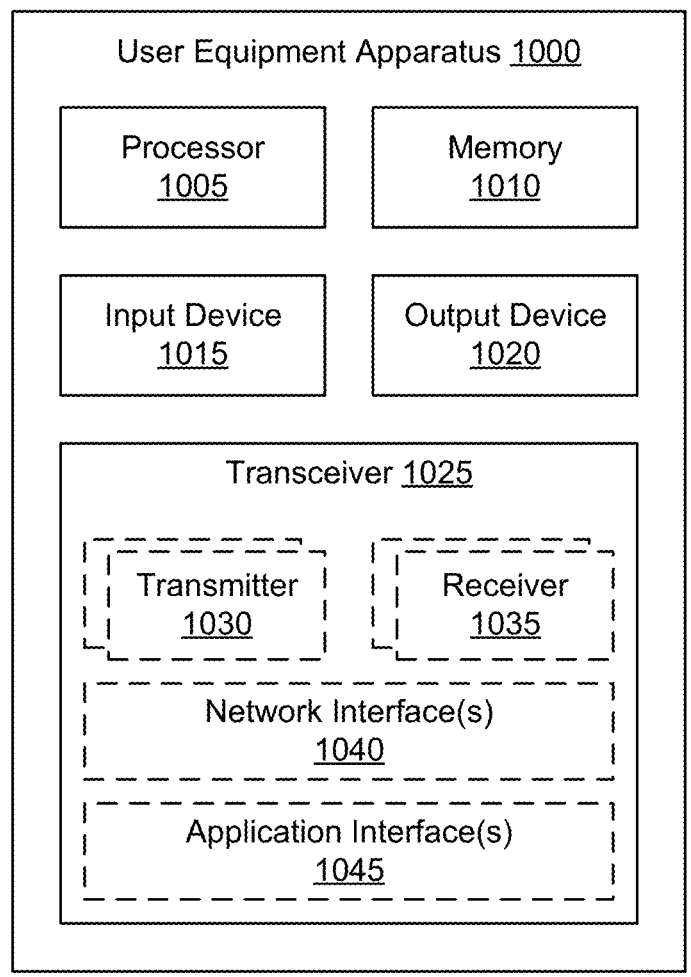
FIG. 10 is a block diagram illustrating one embodiment of a user equipment apparatus that may be used for supporting JED model selection and training.

FIG. 10 depicts a user equipment apparatus 1000 that may be used for supporting JED model selection and training, according to embodiments of the disclosure. In various embodiments, the user equipment apparatus 1000 is used to implement one or more of the solutions described above. The user equipment apparatus 1000 may be one embodiment of the remote unit 105, the receiver 210, the UE 305, and/or the AI-aided JED receiver 510, described above. Furthermore, the user equipment apparatus 1000 may include a processor 1005, a memory 1010, an input device 1015, an output device 1020, and a transceiver 1025.

In some embodiments, the input device 1015 and the output device 1020 are combined into a single device, such as a touchscreen. In certain embodiments, the user equipment apparatus 1000 may not include any input device 1015 and/or output device 1020. In various embodiments, the user equipment apparatus 1000 may include one or more of: the processor 1005, the memory 1010, and the transceiver 1025, and may not include the input device 1015 and/or the output device 1020.

As depicted, the transceiver 1025 includes at least one transmitter 1030 and at least one receiver 1035. In some embodiments, the transceiver 1025 communicates with one or more cells (or wireless coverage areas) supported by one or more base units 121. In various embodiments, the transceiver 1025 is operable on unlicensed spectrum. Moreover, the transceiver 1025 may include multiple UE panels supporting one or more beams. Additionally, the transceiver 1025 may support at least one network interface 1040 and/or application interface 1045. The application interface(s) 1045 may support one or more APIs. The network interface(s) 1040 may support 3GPP reference points, such as Uu, N1, PC5, etc. Other network interfaces 1040 may be supported, as understood by one of ordinary skill in the art.

The processor 1005, in one embodiment, may include any known controller capable of executing computer-readable instructions and/or capable of performing logical operations. For example, the processor 1005 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1005 executes instructions stored in the memory 1010 to perform the methods and routines described herein. The processor 1005 is communicatively coupled to the memory 1010, the input device 1015, the output device 1020, and the transceiver 1025.

In various embodiments, the processor 1005 controls the user equipment apparatus 1000 to implement the above described UE behaviors. In certain embodiments, the processor 1005 may include an application processor (also known as "main processor") which manages application-domain and operating system ("OS") functions and a baseband processor (also known as "baseband radio processor") which manages radio functions.

In various embodiments, the processor 1005 controls the apparatus 1000 to perform the above described JED Model Adjustment functions and behaviors. In such embodiments, the transceiver 1025 receives a first configuration from a network device (i.e., a gNB or RAN entity), said first configuration indicating at least one of: a) a set of resources for model training, b) a type of intended model training, and c) combinations thereof. The processor 1005 selects a Joint Channel Equalization and Decoding ("JED") model from a set of models based on the received first configuration. The processor 1005 trains the selected JED model using the first configuration.

In some embodiments, the set of models includes at least one of: a) a codebook of pre-trained JED models and b) a set of JED models transferred from the network device. In some embodiments, the received first configuration further includes information indicating a model-defining parameter set, and wherein the JED model is selected based on the model-defining parameter set. In some embodiments, the received first configuration further comprises information indicating a selection of a pre-trained JED model from the codebook, and wherein the JED model is selected based on the received indication.

In some embodiments, the type of intended model training includes at least one of: a) channel equalization, b) channel decoding, c) source decoding, d) joint equalization and decoding, e) source encoding, f) channel encoding, and g) combinations thereof.

In some embodiments, the set of resources is a semi-persistent resource that is activated by Physical Downlink Control Channel ("PDCCH") Downlink Control Information ("DCI") with Cyclic Redundancy Check ("CRC") scrambled by a group-common Radio Network Temporary Identifier ("RNTI"). In some embodiments, the set of resources is a semi-persistent resource that is deactivated by PDCCH DCI with CRC scrambled by a group-common RNTI.

In some embodiments, training the selected JED model using the first configuration occurs in response to determining whether to train the selected model based on the first configuration. In some embodiments, determining whether to train the selected JED model is further based on a model training criteria (e.g., a threshold on the decoding error rate or value of a cost/loss function).

In some embodiments, the transceiver 1025 further sends a request to the network device, wherein the first configuration is received in response to the request. In certain embodiments, the request to the network device comprises at least one of: a) a request for model training, b) an indication of a need for re-training of a model, c) a parameter set for a model, d) an indication of a need for re-selection among pre-trained models, and e) combinations thereof.

In certain embodiments, the transceiver 1025 further receives a second configuration for transmitting a training request, said second configuration including at least one of: a) time/frequency channel resources for transmitting the request, b) a beam for transmitting the request, c) a type of information to be embedded in the training request (e.g., decoding error rate or value of an error/loss function, employed model type/architecture), d) a criterion for determining the need for model training (e.g., a threshold on the decoding error rate or value of a cost/loss function), and e) combinations thereof.

In some embodiments, the received first configuration includes at least one of: a) a compressed parameter set for a model, b) a set of time and frequency channel resources to perform model training, c) a set of time and frequency channel resources to perform model transfer, d) a set of transmission and/or reception beams for model training, e) selection information for a pre-trained model from a codebook, and f) combinations thereof.

In some embodiments, the transceiver 1025 further receives a second configuration, including a set of time and frequency and beam channel resources for joint model training and data reception and receiving a data transmission from the network device, said data transmission comprising at least one symbol. Here, the processor 1005 decodes the received data transmission and, in response to determining to train the selected model, the processor 1005 uses the decoded data and the received second configuration to perform training of the selected model and/or re-selection among pre-trained models.

In certain embodiments, the received training resource includes at least one of: a) an index representing a training resource pattern from a codebook, b) a modulation order and coding strategy for the data transmission during the model training period, c) feedback resources (i.e., time and/or frequency and/or beam channel resources) for decoding Ack/Nack during the training phase, d) an indication whether the Ack/Nack feedback is required during the training phase, e) at least one period of pause where the apparatus 1000 may assume to receive no transmission from the network device, and f) combinations thereof.

In certain embodiments, the transceiver 1025 further transmits an indication to the network device, the indication comprising at least one of: a) an indication that the coding rate (when the training phase is simultaneously used for data transmission) and/or modulation order during the training phase is too high, b) an indication that the coding rate (when the training phase is simultaneously used for data transmission) and/or modulation order during the training phase is too low, c) a recommendation for the desirable coding rate and/or modulation order, d) a maximum modulation order and/or coding rate that can be supported during the training phase, e) a minimum and/or maximum coding block that can be supported during the training phase, f) an indication that the device requires additional time to perform the training process, and g) combinations thereof.

In some embodiments, the transceiver 1025 further receives a criterion for ending a training period and concluding the training phase at the apparatus 1000 once an ending criterion is met. In such embodiments, the criterion for ending a training period may include at least one of: a) a threshold on an output error/loss/cost function, b) a maximum processing latency, c) a maximum training duration, and d) combinations thereof.

In certain embodiments, the transceiver 1025 further transmits an indication of the end of the model training to the network device. In certain embodiments, the transceiver 1025 also transmits a report on the current state of the model after the training is concluded. In such embodiments, the transmitted report may include at least one of: a) an achieved level of decoding error rate, b) an error/loss-function value from obtained from the model, c) a measure of processing duration/complexity for training, and d) combinations thereof.

In some embodiments, the transceiver 1025 further transmits a report on a set of multiple known models, said report comprising a corresponding decoding error rate associated with each model and/or an error/cost function associated with each model.

In some embodiments, the received first configuration comprises training information received on a group-common control channel. Here, the training information may include at least one of: a) a time/frequency channel resource for training, b) a transmit beam used for training, c) a training sequence, and d) combinations thereof.

In some embodiments, the transceiver 1025 further receives a set of at least one index from the network device. In such embodiments, the set includes at least one of: a) an index recommending usage of a pre-trained model, b) an index enforcing usage of a pre-trained model, c) a set of indices for requesting evaluation on the indicated pre-trained models, and d) combinations thereof. In certain embodiments, the transceiver 1025 also receives an indicator associated with each index in the set, said indicator comprising:

a) a quality indicator, b) a complexity indictor, c) a priority indicator, and d) combinations thereof.

In some embodiments, the transceiver 1025 further receives selection information. In such embodiments, the processor 1005 selecting and utilizing a pre-trained model from a codebook based on the received selection information. Here, the selection information comprises at least one of: a) expected modulation and encoding strategies to be used in the communication with the network device, b) channel statistics, c) reference signal configurations, and d) combinations thereof. In certain embodiments, the transceiver 1025 additionally receives an index from a known table, said index referencing a set of the parameter values that are relevant for the selection of a pre-trained model.

In some embodiments, the transceiver 1025 further receives at least one of: a) a pre-trained model architecture, b) a compressed version of a pre-trained model architecture, c) a pre-trained model parameter, d) a compressed version of a pre-trained model parameter, and e) combinations thereof. Note that when the model parameters are transferred, the selection information discussed in the preceding paragraph will not be needed.

In some embodiments, the transceiver 1025 further receives a reporting configuration for providing a training measurement report. In such embodiments, the processor 1005 performs training measurements and controls the transceiver 1025 to transmit a measurement report at the configured communication resources. Here, the reporting configuration may include at least one of: a) channel resources (i.e., time and/or frequency and/or beam channel resources) for reporting the measurements, b) compression strategy for the performed measurements, c) the type of measurements and model parameters to be reported, and d) combinations thereof.

In certain embodiments, the received reporting configuration further comprises at least one criterion to limit the training measurements, the storage of conducted training measurements, and/or the reporting of conducted training measurements. Here, the at least one criterion may include one or more of: a) a maximum model complexity, b) a maximum storage time, c) a maximum storage capacity, d) a maximum error level (i.e., decoding error rate or value of a cost/loss function), and e) combinations thereof. In certain embodiments, the performing training measurements and transmitting the measurements report occur without conducting model training or a without model update at the receiver.

In some embodiments, the transceiver 1025 further transmits a capability report on at least one device capability related to model training procedure. Here, the device capabilities may include one or more of: a) types of the supported model trainings, b) a set of the available pre-trained models, c) maximum model size (e.g., maximum number of layers and/or maximum number of processing units), d) available processing and memory resources for model implementation, e) available processing and memory resources for model training procedures, and f) combinations thereof.

In certain embodiments, the transceiver 1025 further receives a reporting configuration from the network device to report the at least one device capability. Here, the reporting configuration may include at least one of: a) a set of beam resources for transmitting the capability report by the apparatus 1000, b) a set of time/frequency resources for transmitting the capability report by the apparatus 1000, and c) a type of the capability report. In some embodiments, the processor 1005 operates the apparatus 1000 with a first device capability during the model training phase and operates the apparatus 1000 with a second device capability during a trained-model phase (e.g., where no model training occurs).

In various embodiments, the processor 1005 controls the apparatus 1000 to perform the above described Joint Link Configuration functions and behaviors. In such embodiments, the transceiver 1025 receives a first configuration from a network device (e.g., a gNB or RAN entity), said first configuration indicating a) at least one symbol for transmission of a reference signal ("RS") and b) one symbol for the transmission of data from the network device to the apparatus 1000. Additionally, the transceiver 1025 receives both the RS and data transmission from the network device according to the first configuration and transmits an indication to the network device indicating feasibility of at least one joint data and RS configuration.

In some embodiments, the indication of the at least one joint data and RS configuration includes at least one of: a) a corresponding decoding error rate, b) an associated error/cost function value, c) an employed model for reception, d) a measure of the associated processing complexity (e.g., processing complexity, processing latency, the number of iterations in an iterative joint equalization and decoding implementation), and e) combinations thereof.

In certain embodiments, the transceiver 1025 further receives a second configuration from the network device for measurement and reporting. Here, the processor 1005 performs measurements according to the second configuration and the transceiver 1025 transmits a measurement report according to the second configuration, said second configuration comprising at least one of: a) a set of resources (e.g., time and/or frequency and/or channel resources) to send a measurement report, b) a criterion by which the measurement report is to be initiated, c) a type of the required measurements (e.g., the set of joint data and RS configurations to be evaluated, a type of the necessary measurement information), and d) combinations thereof. In one embodiment, the second configuration may be included with the first configuration.

In certain embodiments, the transmitted measurement report includes at least one index from a table indicating a joint data and RS configuration. In such embodiments, the transmitted measurement report may include additional information on each of the indicated indices. Here, the additional information may include at least one of: a) a priority of the indicated joint data and RS configuration, b) an associated error rate, c) an associated complexity, d) an associated processing latency, and e) combinations thereof.

In certain embodiments, the transceiver 1025 additionally transmits extended Ack/Nack feedback for a data block, where the Ack/Nack feedback is augmented (i.e., extended) with a subset of the reporting information of the measurements. In such embodiments, the transceiver 1025 may receive a feedback configuration (i.e., an extended Ack/Nack feedback configuration) from the network device, said feedback configuration comprising at least one of: a) occasions where the extended Ack/Nack feedback is to be sent, b) a type of the information to be included in the extended Ack/Nack report, and c) combinations thereof. In one embodiment, the feedback configuration may be included with the first configuration.

In some embodiments, the transceiver 1025 may transmit Ack/Nack feedback (i.e., regular Ack/Nack or augmented/extended Ack/Nack feedback) for a data block and also transmitting supplemental Ack/Nack feedback (i.e., late Ack/Nack feedback) for said data block at a later time. In such embodiments, the supplemental Ack/Nack feedback includes information on at least one of: a) employing a different model for joint equalization and decoding, b) employing a different joint data and RS configuration, and c) an Ack indication following a previous Nack indication.

In some embodiments, the received first configuration further comprises restrictions (e.g., associated maximum processing complexity, maximum processing latency, maximum energy consumption, or combinations thereof) for a particular joint data and RS configuration. In some embodiments, the feasibility of at least one joint data and RS configuration is indicated incrementally on a subset of parameters (e.g., a unit increase/decrease on the coding rate, a parameter codebook index, modulation order, DM-RS density, PT-RS density, or combinations thereof), relative to a previously known joint data and RS configuration.

In some embodiments, the transceiver 1025 further transmits a report on at least one device capabilities related to joint equalization and decoding. Here, the at least one device capability may include one or more of: a) a capability to perform joint data and RS configuration optimization, b) a preference (i.e., "willingness") to perform joint data and RS configuration optimization, c) a capability to perform joint equalization and decoding, d) a preference (i.e., "willingness") to perform joint equalization and decoding, e) available models for reception, f) an available real-time memory, g) an energy storage state (e.g., battery level), h) a free processing capacity, and i) combinations thereof.

In certain embodiments, the transceiver 1025 additionally receives a capabilities reporting configuration from the network device to report the at least one device capability regarding the joint equalization and decoding. Here, the capabilities reporting configuration may include at least one of: a) a set of (i.e., time and/or frequency and/or beam channel resources) resources for transmitting the capability report by the apparatus 1000, b) an expected type of the capability report for joint equalization and decoding, c) a criteria by which the capability reporting can be triggered by the apparatus 1000, and d) combinations thereof. In one embodiment, the capabilities reporting configuration may be included with the first configuration.

In various embodiments, the processor 1005 controls the apparatus 1000 to perform the above described Data-aided CSI measurement/reporting functions and behaviors. In such embodiments, the transceiver 1025 receives a CSI reporting configuration for data-aided CSI measurements from a network device, said CSI reporting configuration including at least one criterion for CSI reporting (e.g., when the measurement is different from a known value more than an indicated threshold). The transceiver 1025 receives scheduling information from the network device, said scheduling information comprising a set of channel resources (i.e., time and/or frequency and/or beam channel resources) for information transmission and receives a signal on the set of channel resources.

The processor 1005 stores the decoded data sequence in the memory 1010 to enable data-aided processing and stores one of: the received signal and a quantized version of the received signal. The processor 1005 decodes the received signal to determine a decoded data sequence and performs at least one data-aided CSI measurement based on both the received signal and the decoded data sequence. The processor 1005 determines whether to transmit a CSI report based on the CSI reporting criteria and the at least one data-aided CSI measurement and the transmitter sends the CSI report comprising at least a portion of the at least one data-aided CSI measurement in response to determining to transmit the CSI report.

In some embodiments, the CSI reporting configuration further comprises an expected type of the expected data-aided CSI measurements. In some embodiments, the transceiver 1025 further transmits a report on at least one device capability related to the data-aided CSI measurements, said at least one device capability comprising one or more of: a) a capability to perform the data-aided CSI measurements, b) a preference (i.e., "willingness") to perform the data-aided CSI measurements, c) available computational models for CSI measurements, d) an available amount of real-time memory, e) an energy storage state (i.e., battery level), f) an available/free processing capacity, g) a criteria for triggering the CSI measurements, and h) combinations thereof.

In certain embodiments, the transceiver 1025 additionally receives a second configuration from the second device to report the device capability regarding the data-aided CSI measurements, said second configuration comprising at least one of: a) a set of resources (i.e., time and/or frequency and/or beam channel resources) for transmitting the capability report by the UE device, b) at least one criterion for triggering the CSI measurement report, c) an expected type of the capability report for the data-aided CSI measurements, and d) combinations thereof. In one embodiment, the second configuration is a part of the CSI reporting configuration.

The memory 1010, in one embodiment, is a computer readable storage medium. In some embodiments, the memory 1010 includes volatile computer storage media. For example, the memory 1010 may include a RAM, including dynamic RAM ("DRAM"), synchronous dynamic RAM ("SDRAM"), and/or static RAM ("SRAM"). In some embodiments, the memory 1010 includes non-volatile computer storage media. For example, the memory 1010 may include a hard disk drive, a flash memory, or any other suitable non-volatile computer storage device. In some embodiments, the memory 1010 includes both volatile and non-volatile computer storage media.

In some embodiments, the memory 1010 stores data related to supporting JED model selection and training and/or mobile operation. For example, the memory 1010 may store various parameters, panel/beam configurations, resource assignments, policies, and the like as described above. In certain embodiments, the memory 1010 also stores program code and related data, such as an operating system or other controller algorithms operating on the apparatus 1000.

The input device 1015, in one embodiment, may include any known computer input device including a touch panel, a button, a keyboard, a stylus, a microphone, or the like. In some embodiments, the input device 1015 may be integrated with the output device 1020, for example, as a touchscreen or similar touch-sensitive display. In some embodiments, the input device 1015 includes a touchscreen such that text may be input using a virtual keyboard displayed on the touchscreen and/or by handwriting on the touchscreen. In some embodiments, the input device 1015 includes two or more different devices, such as a keyboard and a touch panel.

The output device 1020, in one embodiment, is designed to output visual, audible, and/or haptic signals. In some embodiments, the output device 1020 includes an electronically controllable display or display device capable of outputting visual data to a user. For example, the output device 1020 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 1020 may include a wearable display separate from, but communicatively coupled to, the rest of the user equipment apparatus 1000, such as a smart watch, smart glasses, a heads-up display, or the like. Further, the output device 1020 may be a component of a smart phone, a personal digital assistant, a television, a table computer, a notebook (laptop) computer, a personal computer, a vehicle dashboard, or the like.

In certain embodiments, the output device 1020 includes one or more speakers for producing sound. For example, the output device 1020 may produce an audible alert or notification (e.g., a beep or chime). In some embodiments, the output device 1020 includes one or more haptic devices for producing vibrations, motion, or other haptic feedback. In some embodiments, all or portions of the output device 1020 may be integrated with the input device 1015. For example, the input device 1015 and output device 1020 may form a touchscreen or similar touch-sensitive display. In other embodiments, the output device 1020 may be located near the input device 1015.

The transceiver 1025 communicates with one or more network functions of a mobile communication network via one or more access networks. The transceiver 1025 operates under the control of the processor 1005 to transmit messages, data, and other signals and also to receive messages, data, and other signals. For example, the processor 1005 may selectively activate the transceiver 1025 (or portions thereof) at particular times in order to send and receive messages.

The transceiver 1025 includes at least transmitter 1030 and at least one receiver 1035. One or more transmitters 1030 may be used to provide UL communication signals to a base unit 121, such as the UL transmissions described herein. Similarly, one or more receivers 1035 may be used to receive DL communication signals from the base unit 121, as described herein. Although only one transmitter 1030 and one receiver 1035 are illustrated, the user equipment apparatus 1000 may have any suitable number of transmitters 1030 and receivers 1035. Further, the transmitter(s) 1030 and the receiver(s) 1035 may be any suitable type of transmitters and receivers. In one embodiment, the transceiver 1025 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 1025, transmitters 1030, and receivers 1035 may be implemented as physically separate components that access a shared hardware resource and/or software resource, such as for example, the network interface 1040.

In various embodiments, one or more transmitters 1030 and/or one or more receivers 1035 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 1030 and/or one or more receivers 1035 may be implemented and/or integrated into a multi-chip module. In some embodiments, other components such as the network interface 1040 or other hardware components/circuits may be integrated with any number of transmitters 1030 and/or receivers 1035 into a single chip. In such embodiment, the transmitters 1030 and receivers 1035 may be logically configured as a transceiver 1025 that uses one more common control signals or as modular transmitters 1030 and receivers 1035 implemented in the same hardware chip or in a multi-chip module.

Figure 11:
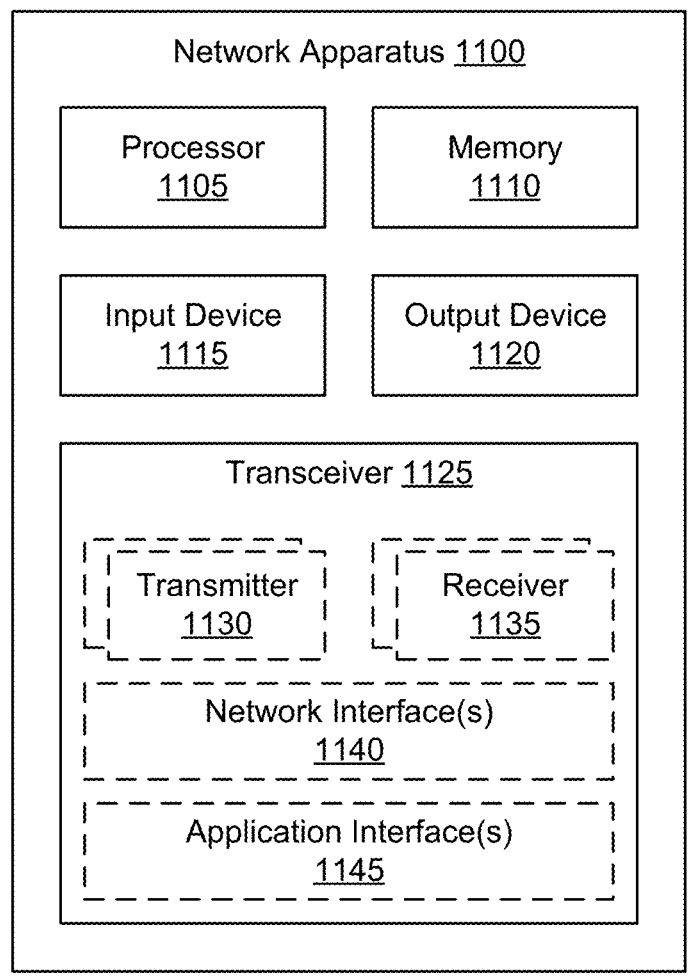
FIG. 11 is a block diagram illustrating one embodiment of a network apparatus that may be used for supporting JED model selection and training.

FIG. 11 depicts a network apparatus 1100 that may be used for supporting JED model selection and training, according to embodiments of the disclosure. In one embodiment, network apparatus 1100 may be one implementation of a RAN device, such as the base unit 121, the transmitter 205, and/or the network node 310, as described above. Furthermore, the base network apparatus 1100 may include a processor 1105, a memory 1110, an input device 1115, an output device 1120, and a transceiver 1125.

In some embodiments, the input device 1115 and the output device 1120 are combined into a single device, such as a touchscreen. In certain embodiments, the network apparatus 1100 may not include any input device 1115 and/or output device 1120. In various embodiments, the network apparatus 1100 may include one or more of: the processor 1105, the memory 1110, and the transceiver 1125, and may not include the input device 1115 and/or the output device 1120.

As depicted, the transceiver 1125 includes at least one transmitter 1130 and at least one receiver 1135. Here, the transceiver 1125 communicates with one or more remote units 105. Additionally, the transceiver 1125 may support at least one network interface 1140 and/or application interface 1145. The application interface(s) 1145 may support one or more APIs. The network interface(s) 1140 may support 3GPP reference points, such as Uu, N1, N2 and N3. Other network interfaces 1140 may be supported, as understood by one of ordinary skill in the art.

The processor 1105, in one embodiment, may include any known controller capable of executing computer-readable instructions and/or capable of performing logical operations. For example, the processor 1105 may be a microcontroller, a microprocessor, a CPU, a GPU, an auxiliary processing unit, a FPGA, or similar programmable controller. In some embodiments, the processor 1105 executes instructions stored in the memory 1110 to perform the methods and routines described herein. The processor 1105 is communicatively coupled to the memory 1110, the input device 1115, the output device 1120, and the transceiver 1125.

In various embodiments, the network apparatus 1100 is a RAN node (e.g., gNB) that communicates with one or more UEs, as described herein. In such embodiments, the processor 1105 controls the network apparatus 1100 to perform the above described RAN behaviors. When operating as a RAN node, the processor 1105 may include an application processor (also known as "main processor") which manages application-domain and operating system ("OS") functions and a baseband processor (also known as "baseband radio processor") which manages radio functions.

In various embodiments, the processor 1105 controls the apparatus 1100 to perform the above described network functions and behaviors. In some embodiments, the processor 1105 controls the transceiver 1125 to transmit a first configuration to a communication device (e.g., a UE), said first configuration indicating a) a set of resources for model training and b) a type of intended model training, wherein the communication device trains a JED model using the first configuration.

In some embodiments, the processor 1105 controls the transceiver 1125 to transmit a first configuration from a network device, said first configuration indicating at least one symbol for transmission of a RS and one symbol for the transmission of data from the network device to the UE device. The transceiver 1125 also transmits the RS and data transmission from the network device according to the first configuration and receives an indication to the network device indicating feasibility of at least one joint data and RS configuration.

In some embodiments, the processor 1105 transmits (via the transceiver 1125) a CSI reporting configuration for data-aided CSI measurements to a communication device (e.g., a UE) and transmits scheduling information to the communication device, the CSI reporting configuration comprising at least one criterion for CSI reporting and the scheduling information comprising a set channel resources for information transmission. The transceiver 1125 further transmits a signal on the set of channel resources and receives a CSI report from the communication device, said report containing at least a portion of at least one data-aided CSI measurement performed by the communication device.

The memory 1110, in one embodiment, is a computer readable storage medium. In some embodiments, the memory 1110 includes volatile computer storage media. For example, the memory 1110 may include a RAM, including dynamic RAM ("DRAM"), synchronous dynamic RAM ("SDRAM"), and/or static RAM ("SRAM"). In some embodiments, the memory 1110 includes non-volatile computer storage media. For example, the memory 1110 may include a hard disk drive, a flash memory, or any other suitable non-volatile computer storage device. In some embodiments, the memory 1110 includes both volatile and non-volatile computer storage media.

In some embodiments, the memory 1110 stores data related to supporting JED model selection and training. For example, the memory 1110 may store parameters, configurations, resource assignments, policies, and the like, as described above. In certain embodiments, the memory 1110 also stores program code and related data, such as an operating system or other controller algorithms operating on the apparatus 1100.

The input device 1115, in one embodiment, may include any known computer input device including a touch panel, a button, a keyboard, a stylus, a microphone, or the like. In some embodiments, the input device 1115 may be integrated with the output device 1120, for example, as a touchscreen or similar touch-sensitive display. In some embodiments, the input device 1115 includes a touchscreen such that text may be input using a virtual keyboard displayed on the touchscreen and/or by handwriting on the touchscreen. In some embodiments, the input device 1115 includes two or more different devices, such as a keyboard and a touch panel.

The output device 1120, in one embodiment, is designed to output visual, audible, and/or haptic signals. In some embodiments, the output device 1120 includes an electronically controllable display or display device capable of outputting visual data to a user. For example, the output device 1120 may include, but is not limited to, an LCD display, an LED display, an OLED display, a projector, or similar display device capable of outputting images, text, or the like to a user. As another, non-limiting, example, the output device 1120 may include a wearable display separate from, but communicatively coupled to, the rest of the network apparatus 1100, such as a smart watch, smart glasses, a heads-up display, or the like. Further, the output device 1120 may be a component of a smart phone, a personal digital assistant, a television, a table computer, a notebook (laptop) computer, a personal computer, a vehicle dashboard, or the like.

In certain embodiments, the output device 1120 includes one or more speakers for producing sound. For example, the output device 1120 may produce an audible alert or notification (e.g., a beep or chime). In some embodiments, the output device 1120 includes one or more haptic devices for producing vibrations, motion, or other haptic feedback. In some embodiments, all or portions of the output device 1120 may be integrated with the input device 1115. For example, the input device 1115 and output device 1120 may form a touchscreen or similar touch-sensitive display. In other embodiments, the output device 1120 may be located near the input device 1115.

The transceiver 1125 includes at least transmitter 1130 and at least one receiver 1135. One or more transmitters 1130 may be used to communicate with the UE, as described herein. Similarly, one or more receivers 1135 may be used to communicate with network functions in the PLMN and/or RAN, as described herein. Although only one transmitter 1130 and one receiver 1135 are illustrated, the network apparatus 1100 may have any suitable number of transmitters 1130 and receivers 1135. Further, the transmitter(s) 1130 and the receiver(s) 1135 may be any suitable type of transmitters and receivers.

Figure 12:
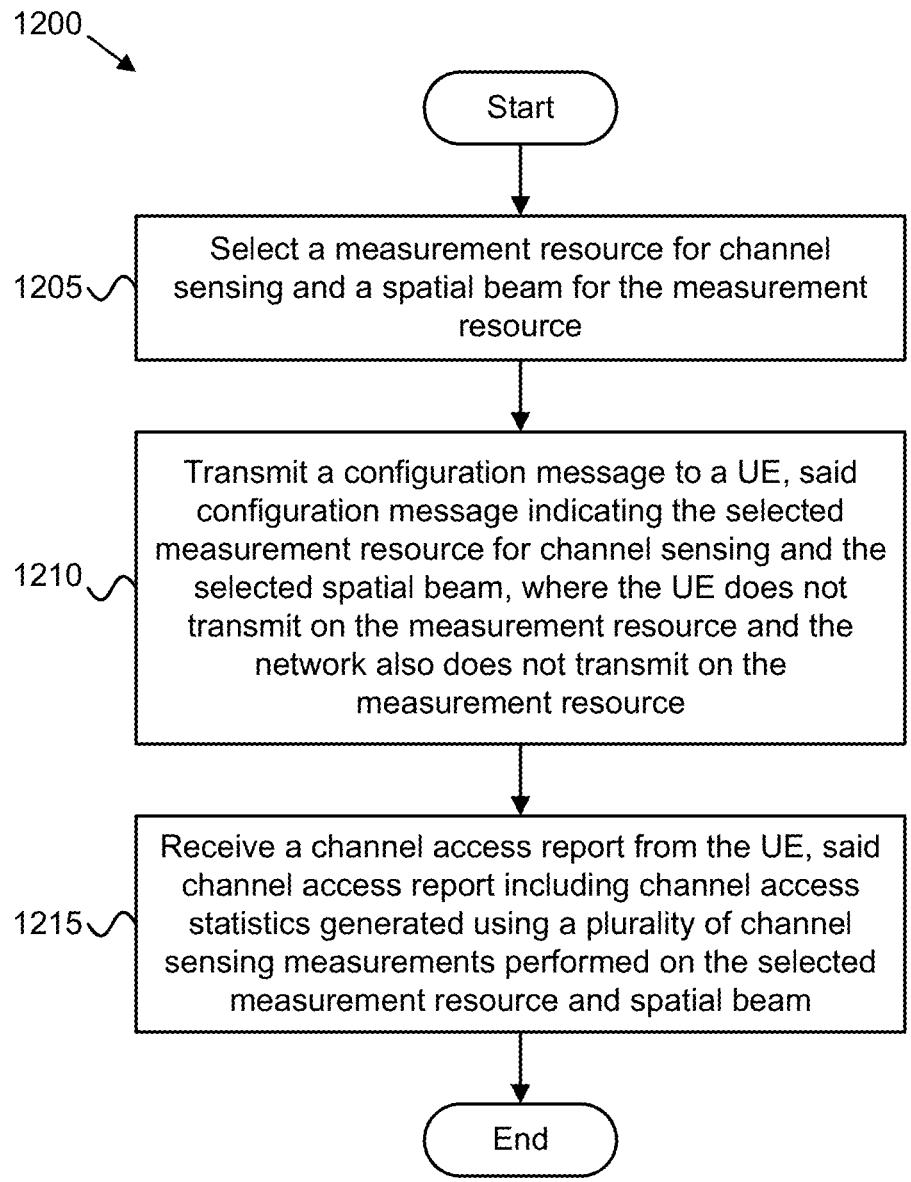
FIG. 12 is a flowchart diagram illustrating one embodiment of a first method for supporting JED model selection and training.

FIG. 12 depicts one embodiment of a method 1200 for supporting JED model selection and training, according to embodiments of the disclosure. In various embodiments, the method 1200 is performed by a communication device, such as the remote unit 105, the receiver 210, the UE 305, the AI-aided JED receiver 510, and/or the user equipment apparatus 1000, as described above. In some embodiments, the method 1200 is performed by a processor, such as a microcontroller, a microprocessor, a CPU, a GPU, an auxiliary processing unit, a FPGA, or the like.

The method 1200 begins and receives 1205 a first configuration from a network device (e.g., a gNB), said first configuration indicating at least one of: a) a set of resources for model training, b) a type of intended model training, c) a type of the model to be used, and d) some combination thereof. The method 1200 includes selecting 1210 a JED model from a set of models based on the received first configuration. The method 1200 includes training 1215 the selected JED model using the first configuration. The method 1200 ends.

Figure 13:
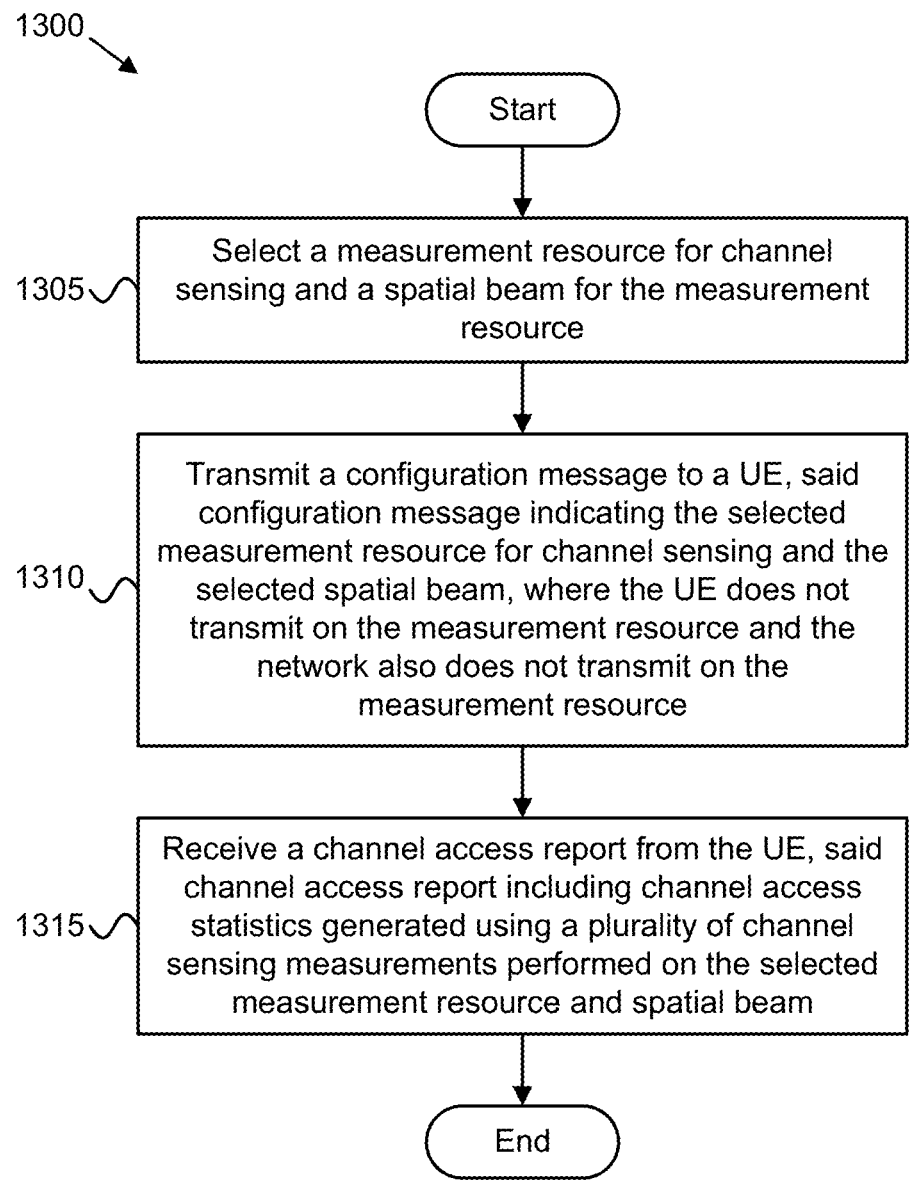
FIG. 13 is a flowchart diagram illustrating one embodiment of a second method for supporting JED model selection and training.

FIG. 13 depicts one embodiment of a method 1300 for supporting JED model selection and training, according to embodiments of the disclosure. In various embodiments, the method 1300 is performed by a communication device, such as the remote unit 105, the receiver 210, the UE 305, the AI-aided JED receiver 510, and/or the user equipment apparatus 1000, as described above. In some embodiments, the method 1300 is performed by a processor, such as a microcontroller, a microprocessor, a CPU, a GPU, an auxiliary processing unit, a FPGA, or the like.

The method 1300 begins and receives 1305 a first configuration from a network device (e.g., a gNB or RAN entity), said first configuration indicating: a) at least one symbol for transmission of a RS and b) one symbol for the transmission of data from the network device to the communication device. The method 1300 includes receiving 1310 both the RS and data transmission from the network device according to the first configuration. The method 1300 includes transmitting 1315 an indication to the network device indicating feasibility of at least one joint data and RS configuration. The method 1300 ends.

Figure 14:
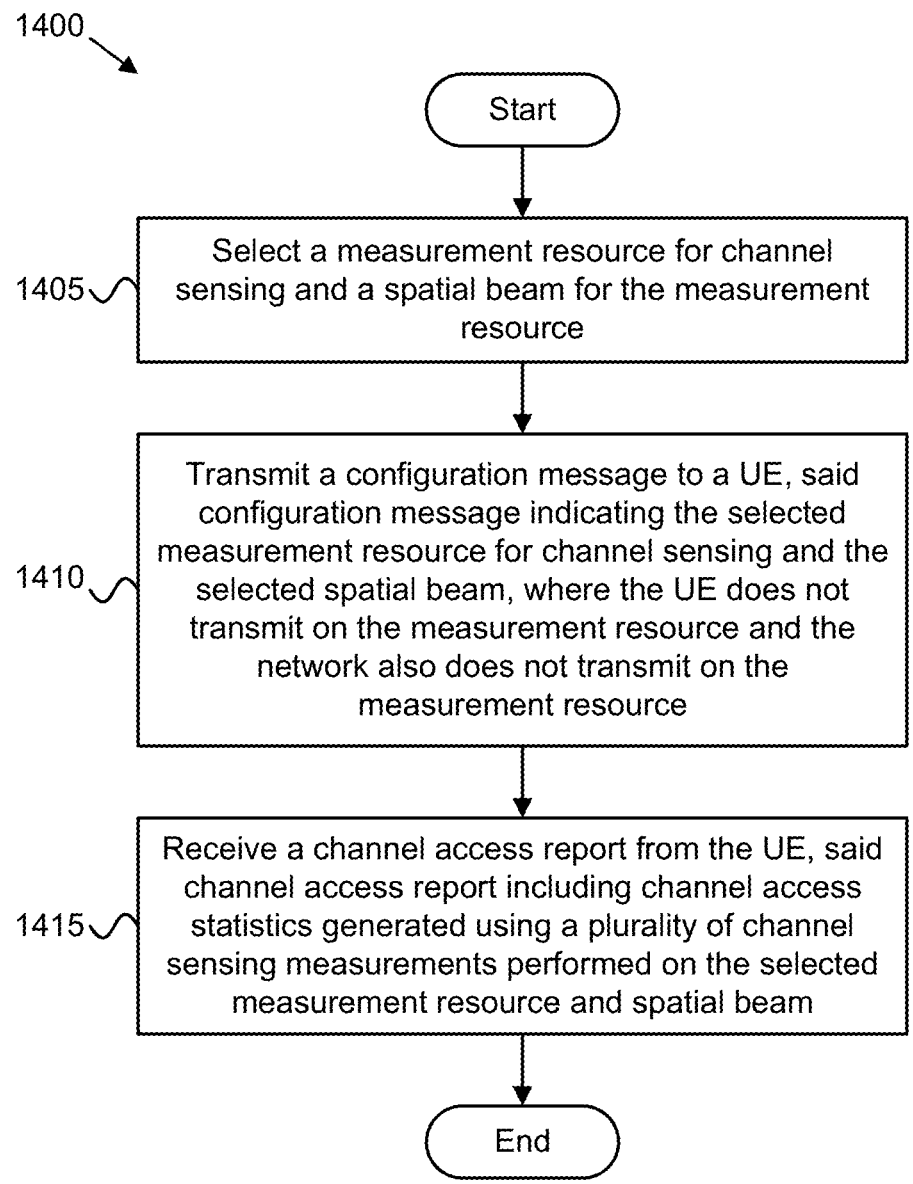
FIG. 14 is a flowchart diagram illustrating one embodiment of a third method for supporting JED model selection and training.

FIG. 14 depicts one embodiment of a method 1400 for supporting JED model selection and training, according to embodiments of the disclosure. In various embodiments, the method 1400 is performed by a communication device, such as the remote unit 105, the receiver 210, the UE 305, the AI-aided JED receiver 510, and/or the user equipment apparatus 1000, as described above. In some embodiments, the method 1400 is performed by a processor, such as a microcontroller, a microprocessor, a CPU, a GPU, an auxiliary processing unit, a FPGA, or the like.

The method 1400 begins and receives 1405 a CSI reporting configuration for data-aided CSI measurements from a network device, said CSI reporting configuration including at least one criterion for CSI reporting (e.g., when the measurement differs from a known value more than an indicated threshold). The method 1400 includes receiving 1410 scheduling information from the network device, said scheduling information comprising a set of channel resources (e.g., time and/or frequency and/or beam channel resources) for information transmission. The method 1400 includes receiving 1415 a signal on the set of channel resources.

The method 1400 includes decoding 1420 the received signal to determine a decoded data sequence. The method 1400 includes 1425 performing at least one data-aided CSI measurement based on both the received signal and the decoded data sequence. The method 1400 includes determining 1430 whether to transmit a CSI report based on the CSI reporting criteria and the at least one data-aided CSI measurement. The method 1400 includes transmitting 1435 the CSI report comprising at least a portion of the at least one data-aided CSI measurement in response to determining to transmit the CSI report. The method 1400 ends.

Disclosed herein is a first apparatus for Joint Channel Equalization and Decoding ("JED"), according to embodiments of the disclosure. The first apparatus may be implemented by a communication device in a mobile communication network, such as the remote unit 105, the receiver 210, the UE 305, the AI-aided JED receiver 510, and/or the user equipment apparatus 1000, described above. The first apparatus includes a processor and a transceiver (i.e., of a radio interface) that receives a first configuration from a network device (i.e., a gNB or RAN entity), said first configuration indicating at least one of: a) a set of resources for model training, b) a type of intended model training, and c) combinations thereof. The processor selects a JED model from a set of models based on the received first configuration. The processor trains the selected JED model using the first configuration.

In some embodiments, the set of models includes at least one of: a) a codebook of pre-trained JED models and b) a set of JED models transferred from the network device. In some embodiments, the received first configuration further includes information indicating a model-defining parameter set, and wherein the JED model is selected based on the model-defining parameter set. In some embodiments, the received first configuration further comprises information indicating a selection of a pre-trained JED model from the codebook, and wherein the JED model is selected based on the received indication.

In some embodiments, the type of intended model training includes at least one of: a) channel equalization, b) channel decoding, c) source decoding, d) joint equalization and decoding, e) source encoding, f) channel encoding, and g) combinations thereof.

In some embodiments, the set of resources is a semi-persistent resource that is activated by Physical Downlink Control Channel ("PDCCH") Downlink Control Information ("DCI") with Cyclic Redundancy Check ("CRC") scrambled by a group-common Radio Network Temporary Identifier ("RNTI"). In some embodiments, the set of resources is a semi-persistent resource that is deactivated by PDCCH DCI with CRC scrambled by a group-common RNTI.

In some embodiments, training the selected JED model using the first configuration occurs in response to determining whether to train the selected model based on the first configuration. In some embodiments, determining whether to train the selected JED model is further based on a model training criteria (e.g., a threshold on the decoding error rate or value of a cost/loss function).

In some embodiments, the transceiver further sends a request to the network device, wherein the first configuration is received in response to the request. In certain embodiments, the request to the network device comprises at least one of: a) a request for model training, b) an indication of a need for re-training of a model, c) a parameter set for a model, d) an indication of a need for re-selection among pre-trained models, and e) combinations thereof.

In certain embodiments, the transceiver further receives a second configuration for transmitting a training request, said second configuration including at least one of: a) time/frequency channel resources for transmitting the request, b) a beam for transmitting the request, c) a type of information to be embedded in the training request (e.g., decoding error rate or value of an error/loss function, employed model type/architecture), d) a criterion for determining the need for model training (e.g., a threshold on the decoding error rate or value of a cost/loss function), and e) combinations thereof.

In some embodiments, the received first configuration includes at least one of: a) a compressed parameter set for a model, b) a set of time and frequency channel resources to perform model training, c) a set of time and frequency channel resources to perform model transfer, d) a set of transmission and/or reception beams for model training, e) selection information for a pre-trained model from a codebook, and f) combinations thereof.

In some embodiments, the transceiver further receives a second configuration, including a set of time and frequency and beam channel resources for joint model training and data reception and receiving a data transmission from the network device, said data transmission comprising at least one symbol. Here, the processor decodes the received data transmission at the first apparatus and, in response to determining to train the selected model, the processor uses the decoded data and the received second configuration to perform training of the selected model and/or re-selection among pre-trained models.

In certain embodiments, the received training resource includes at least one of: a) an index representing a training resource pattern from a codebook, b) a modulation order and coding strategy for the data transmission during the model training period, c) feedback resources (i.e., time and/or frequency and/or beam channel resources) for decoding Ack/Nack during the training phase, d) an indication whether the Ack/Nack feedback is required during the training phase, e) at least one period of pause where the first apparatus may assume to receive no transmission from the network device, and f) combinations thereof.

In certain embodiments, the transceiver further transmits an indication to the network device, the indication comprising at least one of: a) an indication that the coding rate (when the training phase is simultaneously used for data transmission) and/or modulation order during the training phase is too high, b) an indication that the coding rate (when the training phase is simultaneously used for data transmission) and/or modulation order during the training phase is too low, c) a recommendation for the desirable coding rate and/or modulation order, d) a maximum modulation order and/or coding rate that can be supported during the training phase, e) a minimum and/or maximum coding block that can be supported during the training phase, f) an indication that the device requires additional time to perform the training process, and g) combinations thereof.

In some embodiments, the transceiver further receives a criterion for ending a training period and concluding the training phase at the first apparatus once an ending criterion is met. In such embodiments, the criterion for ending a training period may include at least one of: a) a threshold on an output error/loss/cost function, b) a maximum processing latency, c) a maximum training duration, and d) combinations thereof.

In certain embodiments, the transceiver further transmits an indication of the end of the model training to the network device. In certain embodiments, the transceiver also transmits a report on the current state of the model after the training is concluded. In such embodiments, the transmitted report may include at least one of: a) an achieved level of decoding error rate, b) an error/loss-function value from obtained from the model, c) a measure of processing duration/complexity for training, and d) combinations thereof.

In some embodiments, the transceiver further transmits a report on a set of multiple known models, said report comprising a corresponding decoding error rate associated with each model and/or an error/cost function associated with each model.

In some embodiments, the received first configuration comprises training information received on a group-common control channel. Here, the training information may include at least one of: a) a time/frequency channel resource for training, b) a transmit beam used for training, c) a training sequence, and d) combinations thereof.

In some embodiments, the transceiver further receives a set of at least one index from the network device. In such embodiments, the set includes at least one of: a) an index recommending usage of a pre-trained model, b) an index enforcing usage of a pre-trained model, c) a set of indices for requesting evaluation on the indicated pre-trained models, and d) combinations thereof. In certain embodiments, the transceiver also receives an indicator associated with each index in the set, said indicator comprising a) a quality indicator, b) a complexity indictor, c) a priority indicator, and d) combinations thereof.

In some embodiments, the transceiver further receives selection information. In such embodiments, the processor selecting and utilizing a pre-trained model from a codebook based on the received selection information. Here, the selection information comprises at least one of: a) expected modulation and encoding strategies to be used in the communication with the network device, b) channel statistics, c) reference signal configurations, and d) combinations thereof. In certain embodiments, the transceiver additionally receives an index from a known table, said index referencing a set of the parameter values that are relevant for the selection of a pre-trained model.

In some embodiments, the transceiver further receives at least one of: a) a pre-trained model architecture, b) a compressed version of a pre-trained model architecture, c) a pre-trained model parameter, d) a compressed version of a pre-trained model parameter, and e) combinations thereof.

In some embodiments, the transceiver further receives a reporting configuration for providing a training measurement report. In such embodiments, the processor performs training measurements and controls the transceiver to transmit a measurement report at the configured communication resources. Here, the reporting configuration may include at least one of: a) channel resources (i.e., time and/or frequency and/or beam channel resources) for reporting the measurements, b) compression strategy for the performed measurements, c) the type of measurements and model parameters to be reported, and d) combinations thereof.

In certain embodiments, the received reporting configuration further comprises at least one criterion to limit the training measurements, the storage of conducted training measurements, and/or the reporting of conducted training measurements. Here, the at least one criterion may include one or more of: a) a maximum model complexity, b) a maximum storage time, c) a maximum storage capacity, d) a maximum error level (i.e., decoding error rate or value of a cost/loss function), and e) combinations thereof. In certain embodiments, the performing training measurements and transmitting the measurements report occur without conducting model training or a without model update at the receiver.

In some embodiments, the transceiver further transmits a capability report on at least one device capability related to model training procedure. Here, the device capabilities may include one or more of: a) types of the supported model trainings, b) a set of the available pre-trained models, c) maximum model size (e.g., maximum number of layers and/or maximum number of processing units), d) available processing and memory resources for model implementation, e) available processing and memory resources for model training procedures, and f) combinations thereof.

In certain embodiments, the transceiver further receives a reporting configuration from the network device to report the at least one device capability. Here, the reporting configuration may include at least one of: a) a set of beam resources for transmitting the capability report by the first apparatus, b) a set of time/frequency resources for transmitting the capability report by the first apparatus, and c) a type of the capability report. In some embodiments, the processor operates the first apparatus with a first device capability during the model training phase and operates the first apparatus with a second device capability during a trained-model phase (e.g., where no model training occurs).

Disclosed herein is a first method for JED model adjustment, according to embodiments of the disclosure. The first method may be performed by a communication device in a mobile communication network, such as the remote unit 105, the receiver 210, the UE 305, the AI-aided JED receiver 510, and/or the user equipment apparatus 1000, described above. The first method includes receiving a first configuration from a network device (i.e., a gNB), said first configuration indicating at least one of: a) a set of resources for model training, b) a type of intended model training, c) a type of the model to be used, and d) some combination thereof. The first method includes selecting a Joint Channel Equalization and Decoding ("JED") model from a set of models based on the received first configuration and training the selected JED model using the first configuration.

In some embodiments, the set of models includes at least one of: a) a codebook of pre-trained JED models and b) a set of JED models transferred from the network device. In some embodiments, the received first configuration further includes information indicating a model-defining parameter set, and wherein the JED model is selected based on the model-defining parameter set. In some embodiments, the received first configuration further comprises information indicating a selection of a pre-trained JED model from the codebook, and wherein the JED model is selected based on the received indication.

In some embodiments, the type of intended model training includes at least one of: a) channel equalization, b) channel decoding, c) source decoding, d) joint equalization and decoding, e) source encoding, f) channel encoding, and g) some combination thereof.

In some embodiments, the set of resources is a semi-persistent resource that is activated by Physical Downlink Control Channel ("PDCCH") Downlink Control Information ("DCI") with Cyclic Redundancy Check ("CRC") scrambled by a group-common Radio Network Temporary Identifier ("RNTI"). In some embodiments, the set of resources is a semi-persistent resource that is deactivated by PDCCH DCI with CRC scrambled by a group-common RNTI.

In some embodiments, training the selected JED model using the first configuration occurs in response to determining whether to train the selected model based on the first configuration. In some embodiments, determining whether to train the selected JED model is further based on a model training criteria (e.g., a threshold on the decoding error rate or value of a cost/loss function).

In some embodiments, the first method further includes sending a request to the network device, wherein the first configuration is received in response to the request. In certain embodiments, the request to the network device comprises at least one of: a) a request for model training, b) an indication of a need for re-training of a model, c) a parameter set for a model, d) an indication of a need for re-selection among pre-trained models, and e) some combination thereof.

In certain embodiments, the first method further includes receiving a second configuration for transmitting a training request, said second configuration including at least one of: a) time/frequency channel resources for transmitting the request, b) a beam for transmitting the request, c) a type of information to be embedded in the training request (e.g., decoding error rate or value of an error/loss function, employed model type/architecture), d) a criterion for determining the need for model training (e.g., a threshold on the decoding error rate or value of a cost/loss function), and e) some combination thereof.

In some embodiments, the received first configuration includes at least one of: a) a compressed parameter set for a model, b) a set of time and frequency channel resources to perform model training, c) a set of time and frequency channel resources to perform model transfer, d) a set of transmission and/or reception beams for model training, e) selection information for a pre-trained model from a codebook, and f) some combination thereof.

In some embodiments, the first method further includes receiving a second configuration, including a set of time and frequency and beam channel resources for joint model training and data reception and receiving a data transmission from the network device, said data transmission comprising at least one symbol. Here, the first method also includes decoding the received data transmission at the communication device and, in response to determining to train the selected model, using the decoded data and the received second configuration to perform training of the selected model and/or re-selection among pre-trained models.

In certain embodiments, the received training resource includes at least one of: a) an index representing a training resource pattern from a codebook, b) a modulation order and coding strategy for the data transmission during the model training period, c) feedback resources (i.e., time and/or frequency and/or beam channel resources) for decoding Ack/Nack during the training phase, d) an indication whether the Ack/Nack feedback is required during the training phase, e) at least one period of pause where the communication device may assume to receive no transmission from the network device, and f) some combination thereof.

In certain embodiments, the first method further includes transmitting an indication to the network device, the indication comprising at least one of: a) an indication that the coding rate (when the training phase is simultaneously used for data transmission) and/or modulation order during the training phase is too high, b) an indication that the coding rate (when the training phase is simultaneously used for data transmission) and/or modulation order during the training phase is too low, c) a recommendation for the desirable coding rate and/or modulation order, d) a maximum modulation order and/or coding rate that can be supported during the training phase, e) a minimum and/or maximum coding block that can be supported during the training phase, f) an indication that the device requires additional time to perform the training process, and g) some combination thereof.

In some embodiments, the first method further includes receiving a criterion for ending a training period and concluding the training phase at the communication device once an ending criterion is met. In such embodiments, the criterion for ending a training period may include at least one of: a) a threshold on an output error/loss/cost function, b) a maximum processing latency, c) a maximum training duration, and d) some combination thereof.

In certain embodiments, the first method also includes transmitting an indication of the end of the model training to the network device. In certain embodiments, the first method includes transmitting a report on the current state of the model after the training is concluded. In such embodiments, the transmitted report may include at least one of: a) an achieved level of decoding error rate, b) an error/loss-function value from obtained from the model, c) a measure of processing duration/complexity for training, and d) some combination thereof.

In some embodiments, the first method further includes transmitting a report on a set of multiple known models, said report comprising a corresponding decoding error rate associated with each model and/or an error/cost function associated with each model.

In some embodiments, the received first configuration comprises training information received on a group-common control channel. Here, the training information may include at least one of: a) a time/frequency channel resource for training, b) a transmit beam used for training, c) a training sequence, and d) some combination thereof.

In some embodiments, the first method further includes receiving a set of at least one index from the network device. In such embodiments, the set includes at least one of: a) an index recommending usage of a pre-trained model, b) an index enforcing usage of a pre-trained model, c) a set of indices for requesting evaluation on the indicated pre-trained models, and d) some combination thereof. In certain embodiments, the first method also includes receiving an indicator associated with each index in the set, said indicator comprising: a) a quality indicator, b) a complexity indictor, c) a priority indicator, and d) some combination thereof.

In some embodiments, the first method further includes receiving selection information. In such embodiments, the first method also includes selecting and utilizing a pre-trained model from a codebook based on the received selection information. Here, the selection information comprises at least one of: a) expected modulation and encoding strategies to be used in the communication with the network device, b) channel statistics, c) reference signal configurations, and d) some combination thereof. In certain embodiments, the first method additionally includes receiving an index from a known table, said index referencing a set of the parameter values that are relevant for the selection of a pre-trained model.

In some embodiments, the first method further includes receiving at least one of: a) a pre-trained model architecture, b) a compressed version of a pre-trained model architecture, c) a pre-trained model parameter, d) a compressed version of a pre-trained model parameter, and e) some combination thereof.

In some embodiments, the first method further includes receiving a reporting configuration for providing a training measurement report. In such embodiments, the first method also includes performing training measurements and transmitting a measurement report at the configured communication resources. Here, the reporting configuration may include at least one of: a) channel resources (i.e., time and/or frequency and/or beam channel resources) for reporting the measurements, b) compression strategy for the performed measurements, c) the type of measurements and model parameters to be reported, and d) some combination thereof.

In certain embodiments, the received reporting configuration further comprises at least one criterion to limit the training measurements, the storage of conducted training measurements, and/or the reporting of conducted training measurements. Here, the at least one criterion may include one or more of: a) a maximum model complexity, b) a maximum storage time, c) a maximum storage capacity, d) a maximum error level (i.e., decoding error rate or value of a cost/loss function), and e) some combination thereof. In certain embodiments, the performing training measurements and transmitting the measurements report occur without conducting model training or a without model update at the receiver.

In some embodiments, the first method further includes transmitting a capability report on at least one device capability related to model training procedure. Here, the device capabilities may include one or more of: a) types of the supported model trainings, b) a set of the available pre-trained models, c) maximum model size (e.g., maximum number of layers and/or maximum number of processing units), d) available processing and memory resources for model implementation, e) available processing and memory resources for model training procedures, and f) some combination thereof.

In certain embodiments, the first method also includes receiving a reporting configuration from the network device to report the at least one device capability. Here, the reporting configuration may include at least one of: a) a set of beam resources for transmitting the capability report by the communication device, b) a set of time/frequency resources for transmitting the capability report by the communication device, and c) a type of the capability report.

In some embodiments, the first method further includes: operating the communication device with a first device capability during the model training phase and operating the communication device with a second device capability during a trained-model (no model-training) phase.

Disclosed herein is a second apparatus for enhanced link configuration with JED receiver, according to embodiments of the disclosure. The second apparatus may be implemented by a communication device in a mobile communication network, such as the remote unit 105, the receiver 210, the UE 305, the AI-aided JED receiver 510, and/or the user equipment apparatus 1000, described above. The second apparatus includes a processor and a transceiver (i.e., of a radio interface) that receives a first configuration from a network device (e.g., a gNB or RAN entity), said first configuration indicating a) at least one symbol for transmission of a reference signal ("RS") and b) one symbol for the transmission of data from the network device to the second apparatus. Additionally, the transceiver receives both the RS and data transmission from the network device according to the first configuration and transmits an indication to the network device indicating feasibility of at least one joint data and RS configuration.

In some embodiments, the indication of the at least one joint data and RS configuration includes at least one of: a) a corresponding decoding error rate, b) an associated error/cost function value, c) an employed model for reception, d) a measure of the associated processing complexity (e.g., processing complexity, processing latency, the number of iterations in an iterative joint equalization and decoding implementation), and e) combinations thereof.

In certain embodiments, the transceiver further receives a second configuration from the network device for measurement and reporting. Here, the processor performs measurements according to the second configuration and the transceiver transmits a measurement report according to the second configuration, said second configuration comprising at least one of: a) a set of resources (e.g., time and/or frequency and/or channel resources) to send a measurement report, b) a criterion by which the measurement report is to be initiated, c) a type of the required measurements (e.g., the set of joint data and RS configurations to be evaluated, a type of the necessary measurement information), and d) combinations thereof. In one embodiment, the second configuration may be included with the first configuration.

In certain embodiments, the transmitted measurement report includes at least one index from a table indicating a joint data and RS configuration. In such embodiments, the transmitted measurement report may include additional information on each of the indicated indices. Here, the additional information may include at least one of: a) a priority of the indicated joint data and RS configuration, b) an associated error rate, c) an associated complexity, d) an associated processing latency, and e) combinations thereof.

In certain embodiments, the transceiver additionally transmits extended Ack/Nack feedback for a data block, where the Ack/Nack feedback is augmented (i.e., extended) with a subset of the reporting information of the measurements. In such embodiments, the transceiver may receive a feedback configuration (i.e., an extended Ack/Nack feedback configuration) from the network device, said feedback configuration comprising at least one of: a) occasions where the extended Ack/Nack feedback is to be sent, b) a type of the information to be included in the extended Ack/Nack report, and c) combinations thereof. In one embodiment, the feedback configuration may be included with the first configuration.

In some embodiments, the transceiver may transmit Ack/Nack feedback (i.e., regular Ack/Nack or augmented/extended Ack/Nack feedback) for a data block and also transmitting supplemental Ack/Nack feedback (i.e., late Ack/Nack feedback) for said data block at a later time. In such embodiments, the supplemental Ack/Nack feedback includes information on at least one of: a) employing a different model for joint equalization and decoding, b) employing a different joint data and RS configuration, and c) an Ack indication following a previous Nack indication.

In some embodiments, the received first configuration further comprises restrictions (e.g., associated maximum processing complexity, maximum processing latency, maximum energy consumption, or combinations thereof) for a particular joint data and RS configuration. In some embodiments, the feasibility of at least one joint data and RS configuration is indicated incrementally on a subset of parameters (e.g., a unit increase/decrease on the coding rate, a parameter codebook index, modulation order, DM-RS density, PT-RS density, or combinations thereof), relative to a previously known joint data and RS configuration.

In some embodiments, the transceiver further transmits a report on at least one device capabilities related to joint equalization and decoding. Here, the at least one device capability may include one or more of: a) a capability to perform joint data and RS configuration optimization, b) a preference (i.e., "willingness") to perform joint data and RS configuration optimization, c) a capability to perform joint equalization and decoding, d) a preference (i.e., "willingness") to perform joint equalization and decoding, e) available models for reception, f) an available real-time memory, g) an energy storage state (e.g., battery level), h) a free processing capacity, and i) combinations thereof.

In certain embodiments, the transceiver additionally receives a capabilities reporting configuration from the network device to report the at least one device capability regarding the joint equalization and decoding. Here, the capabilities reporting configuration may include at least one of: a) a set of (i.e., time and/or frequency and/or beam channel resources) resources for transmitting the capability report by the second apparatus, b) an expected type of the capability report for joint equalization and decoding, c) a criteria by which the capability reporting can be triggered by the second apparatus, and d) combinations thereof. In one embodiment, the capabilities reporting configuration may be included with the first configuration.

Disclosed herein is a second method for enhanced link configuration with JED receiver, according to embodiments of the disclosure. The second method may be performed by a communication device in a mobile communication network, such as the remote unit 105, the receiver 210, the UE 305, the AI-aided JED receiver 510, and/or the user equipment apparatus 1000, described above. The second method includes receiving a first configuration from a network device (e.g., a gNB or RAN entity), said first configuration indicating: a) at least one symbol for transmission of a RS and b) one symbol for the transmission of data from the network device to the communication device. The second method includes receiving both the RS and data transmission from the network device according to the first configuration and transmitting an indication to the network device indicating feasibility of at least one joint data and RS configuration.

In some embodiments, the indication of the at least one joint data and RS configuration includes at least one of: a) a corresponding decoding error rate, b) an associated error/cost function value, c) an employed model for reception, d) a measure of the associated processing complexity (e.g., processing complexity, processing latency, the number of iterations in an iterative joint equalization and decoding implementation), and e) some combination thereof.

In certain embodiments, the second method further includes receiving a second configuration from the network device for measurement and reporting. Here, the second method also includes performing measurements according to the second configuration and transmitting a measurement report according to the second configuration, said second configuration comprising at least one of: a) a set of time/frequency/channel resources to send a measurement report, b) a criterion by which the measurement report is to be initiated, c) a type of the required measurements (e.g., the set of joint data and RS configurations to be evaluated, a type of the necessary measurement information), and d) some combination thereof. In one embodiment, the second configuration is a part of the first configuration.

In certain embodiments, the transmitted measurement report includes at least one index from a table indicating a joint data and RS configuration. In such embodiments, the transmitted measurement report may include additional information on each of the indicated indices. Here, the additional information may include at least one of: a) a priority of the indicated joint data and RS configuration, b) an associated error rate, c) an associated complexity, d) an associated processing latency, and e) some combination thereof.

In certain embodiments, the second method additionally includes transmitting extended Ack/Nack feedback for a data block, where the Ack/Nack feedback is augmented (i.e., extended) with a subset of the reporting information of the measurements. In such embodiments, the second method may include receiving a feedback configuration (i.e., an extended Ack/Nack feedback configuration) from the network device, said feedback configuration comprising at least one of: a) occasions where the extended Ack/Nack feedback is to be sent, b) a type of the information to be included in the extended Ack/Nack report, and c) some combination thereof. In one embodiment, the feedback configuration is a part of the first configuration.

In some embodiments, the second method may include transmitting Ack/Nack feedback (i.e., regular Ack/Nack or augmented/extended Ack/Nack feedback) for a data block and also transmitting supplemental Ack/Nack feedback (i.e., late Ack/Nack feedback) for said data block at a later time. In such embodiments, the supplemental Ack/Nack feedback includes information on at least one of: a) employing a different model for joint equalization and decoding, b) employing a different joint data and RS configuration, c) an Ack indication following a previous Nack indication.

In some embodiments, the received first configuration further includes restrictions (e.g., associated maximum processing complexity, maximum processing latency, maximum energy consumption, or some combination thereof) for a particular joint data and RS configuration. In some embodiments, the feasibility of at least one joint data and RS configuration is indicated incrementally on a subset of parameters (e.g., a unit increase/decrease on the coding rate, a parameter codebook index, modulation order, DM-RS density, PT-RS density, or some combination thereof), relative to a previously known joint data and RS configuration.

In some embodiments, the second method further includes transmitting a report on at least one device capabilities related to joint equalization and decoding. Here, the at least one device capability may include one or more of: a) a capability to perform joint data and RS configuration optimization, b) a preference (i.e., "willingness") to perform joint data and RS configuration optimization, c) a capability to perform joint equalization and decoding, d) a preference (i.e., "willingness") to perform joint equalization and decoding, e) available models for reception, f) an available real-time memory, g) an energy storage state (e.g., battery level), h) a free processing capacity, and i) some combination thereof.

In certain embodiments, the second method additionally includes receiving a capabilities reporting configuration from the network device to report the at least one device capability regarding the joint equalization and decoding. Here, the capabilities reporting configuration may include at least one of: a) a set of (i.e., time and/or frequency and/or beam channel resources) resources for transmitting the capability report by the communication device, b) an expected type of the capability report for joint equalization and decoding, c) a criteria by which the capability reporting can be triggered by the communication device, and d) some combination thereof. In one embodiment, the capabilities reporting configuration is a part of the first configuration.

Disclosed herein is a third apparatus for data-aided CSI measurement and reporting, according to embodiments of the disclosure. The third apparatus may be implemented by a communication device in a mobile communication network, such as the remote unit 105, the receiver 210, the UE 305, the AI-aided JED receiver 510, and/or the user equipment apparatus 1000, described above. The third apparatus includes a processor, a memory storage, and a transceiver (i.e., of a radio interface) that receives a CSI reporting configuration for data-aided CSI measurements from a network device, said CSI reporting configuration including at least one criterion for CSI reporting (e.g., when the measurement is different from a known value more than an indicated threshold). The transceiver receives scheduling information from the network device, said scheduling information comprising a set of channel resources (i.e., time and/or frequency and/or beam channel resources) for information transmission and receives a signal on the set of channel resources.

The memory storage stores the decoded data sequence to enable data-aided processing and stores one of: the received signal and a quantized version of the received signal. The processor decodes the received signal to determine a decoded data sequence and performs at least one data-aided CSI measurement based on both the received signal and the decoded data sequence. The processor determines whether to transmit a CSI report based on the CSI reporting criteria and the at least one data-aided CSI measurement and the transmitter sends the CSI report comprising at least a portion of the at least one data-aided CSI measurement in response to determining to transmit the CSI report.

In some embodiments, the CSI reporting configuration further comprises an expected type of the expected data-aided CSI measurements. In some embodiments, the transceiver further transmits a report on at least one device capability related to the data-aided CSI measurements, said at least one device capability comprising one or more of: a) a capability to perform the data-aided CSI measurements, b) a preference (i.e., "willingness") to perform the data-aided CSI measurements, c) available computational models for CSI measurements, d) an available amount of real-time memory, e) an energy storage state (i.e., battery level), f) an available/free processing capacity, g) a criteria for triggering the CSI measurements, and h) combinations thereof.

In certain embodiments, the transceiver additionally receives a second configuration from the second device to report the device capability regarding the data-aided CSI measurements, said second configuration comprising at least one of: a) a set of resources (i.e., time and/or frequency and/or beam channel resources) for transmitting the capability report by the UE device, b) at least one criterion for triggering the CSI measurement report, c) an expected type of the capability report for the data-aided CSI measurements, and d) combinations thereof. In one embodiment, the second configuration is a part of the CSI reporting configuration.

Disclosed herein is a third method for data-aided CSI measurement and reporting, according to embodiments of the disclosure. The third method may be performed by a communication device in a mobile communication network, such as the remote unit 105, the receiver 210, the UE 305, the AI-aided JED receiver 510, and/or the user equipment apparatus 1000, described above. The third method includes receiving a CSI reporting configuration for data-aided CSI measurements from a network device, said CSI reporting configuration including at least one criterion for CSI reporting (e.g., when the measurement is different from a known value more than an indicated threshold). The third method includes receiving scheduling information from the network device, said scheduling information comprising a set of channel resources (i.e., time and/or frequency and/or beam channel resources) for information transmission. The third method includes receiving a signal on the set of channel resources, decoding the received signal to determine a decoded data sequence, and performing at least one data-aided CSI measurement based on both the received signal and the decoded data sequence. The third method includes determining whether to transmit a CSI report based on the CSI reporting criteria and the at least one data-aided CSI measurement and transmitting the CSI report comprising at least a portion of the at least one data-aided CSI measurement in response to determining to transmit the CSI report.

In some embodiments, the CSI reporting configuration further comprises an expected type of the expected data-aided CSI measurements. In some embodiments, the third method further includes transmitting a report on at least one device capability related to the data-aided CSI measurements, said at least one device capability comprising one or more of: a) a capability to perform the data-aided CSI measurements, b) a preference (i.e., "willingness") to perform the data-aided CSI measurements, c) available computational models for CSI measurements, d) an available amount of real-time memory, e) an energy storage state (i.e., battery level), f) an available/free processing capacity, g) a criteria for triggering the CSI measurements, and h) some combination thereof.

In certain embodiments, the third method additionally includes receiving a second configuration from the second device to report the device capability regarding the data-aided CSI measurements, said second configuration comprising at least one of: a) a set of resources (i.e., time and/or frequency and/or beam channel resources) for transmitting the capability report by the UE device, b) at least one criterion for triggering the CSI measurement report, c) an expected type of the capability report for the data-aided CSI measurements, and d) some combination thereof. In one embodiment, the second configuration is a part of the CSI reporting configuration.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A User Equipment ("UE") for wireless communication, comprising:
   at least one memory; and
   at least one processor coupled with the at least one memory and configured to cause the UE to:
   receive, from a network device, a first configuration indicating at least one of: a set of resources for model training, a type of intended model training, a type of a model to be used, or a combination thereof;
   receive an indication of a wireless channel condition, wherein the indication comprises an index of a first codebook of predetermined channel condition parameters;
   select a joint channel equalization and decoding ("JED") model from a second codebook of predefined models based on the indication of the wireless channel condition and the received first configuration; and
   train the selected JED model using the first configuration.

2. The UE of claim 1, wherein the at least one processor is configured to cause the UE to receive a set of predefined models corresponding to the second codebook of predefined JED models, wherein the set of predefined models comprises one or multiple JED models transferred from the network device, or one or multiple JED models transferred from another UE device via direct communication to the UE device.

3. The UE of claim 1, wherein the type of intended model training comprises at least one of:
   channel equalization,
   channel decoding,
   source decoding,
   joint equalization and decoding,
   source encoding,
   channel encoding,
   or a combination thereof.

4. The UE of claim 1, wherein the at least one processor is further configured to cause the UE to transmit a request to the network device, wherein the first configuration is received in response to the request, the request comprising at least one of:
   a request for model training,
   an indication of a need for re-training of a model,
   a parameter set for a model,
   an indication of a need for re-selection among pre-trained models,
   or a combination thereof.

5. The UE of claim 1, wherein the at least one processor is further configured to cause the UE to transmit a report on a set of known models, the report comprising a corresponding decoding error rate associated with each known model and/or an error/cost function associated with each known model.

6. The UE of claim 1, wherein the at least one processor is further configured to cause the UE to receive at least one of:
   a pre-trained model architecture,
   a compressed version of a pre-trained model architecture,
   a pre-trained model parameter,
   a compressed version of a pre-trained model parameter,
   or a combination thereof.

7. The UE of claim 1, wherein the at least one processor is further configured to cause the UE to:
   receive a reporting configuration for providing a training measurement report;
   perform training measurements; and
   transmit a measurement report using configured communication resources, the reporting configuration comprising at least one of:
   channel resources for reporting the training measurements,
   a compression strategy for the training measurements,
   a type of measurements and model parameters to be reported,
   or a combination thereof.

8. The UE of claim 7, wherein the received reporting configuration further comprises at least one criterion to limit the training measurements, for storing the performed training measurements, for reporting the performed training measurements, or a combination thereof, and wherein the at least one criterion comprises one or more of:
   a maximum model complexity,
   a maximum storage time,
   a maximum storage capacity,
   a maximum error level,
   or a combination thereof.

9. The UE of claim 1, wherein the at least one processor is further configured to cause the UE to transmit a capability report on at least one device capability related to model training procedure, the at least one device capability comprising one or more of:
   types of supported model trainings,
   a set of available pre-trained models,
   a maximum model size,
   available processing and memory resources for model implementation,
   available processing and memory resources for model training procedures,
   or a combination thereof.

10. The UE of claim 1, further comprising:
    receive, from the network device, a second configuration indicating at least one symbol for transmission of a reference signal ("RS") and one symbol for transmission of data from the network device to the UE device,
    receive the RS and data transmission from the network device according to the second configuration,
    transmit an indication to the network device indicating feasibility of at least one joint data and RS configuration.

11. The UE of claim 10, wherein the indication of the at least one joint data and RS configuration includes at least one of:
    a corresponding decoding error rate,
    an associated error/cost function value,
    an employed model for reception,
    a measure of the associated processing complexity,
    or a combination thereof.

12. The UE of claim 11, wherein the at least one processor is further configured to cause the UE to:
    receive, from the network device, a third configuration for measurement and reporting;
    perform measurements according to the third; and
    transmit a measurement report according to the third configuration, the third configuration comprising at least one of:

a set of resources to send a measurement report,
a criterion by which the measurement report is to be initiated,
a type of required measurements,
or a combination thereof.

13. The UE of claim 12, wherein the transmitted measurement report comprises at least one index from a table indicating a joint data and RS configuration.

14. The UE of claim 1, wherein the at least one processor is further configured to cause the UE to:
receive a Channel State Information ("CSI") reporting configuration for data-aided CSI measurements from the network device, the CSI reporting configuration comprising at least one criterion for CSI reporting;
receive scheduling information from the network device, the scheduling information comprising a set of channel resources for information transmission;
receive a signal on the set of channel resources;
decode the received signal to determine a decoded data sequence;
perform at least one data-aided CSI measurement based on both the received signal and the decoded data sequence;
determine whether to transmit a CSI report based on CSI reporting criteria and the at least one data-aided CSI measurement; and
transmit the CSI report comprising at least a portion of the at least one data-aided CSI measurement in response to determining to transmit the CSI report.

15. The UE of claim 14, wherein the CSI reporting configuration further comprises an expected type of data-aided CSI measurements.

16. The UE of claim 14, wherein the at least one processor is further configured to cause the UE to transmit a report on at least one device capability related to the data-aided CSI measurements, the at least one device capability comprising one or more of:
a capability to perform the data-aided CSI measurements,
a preference to perform the data-aided CSI measurements,
available computational models for CSI measurements,
an available amount of real-time memory,
an energy storage state,
an available processing capacity,
a criterion for triggering the CSI measurements,
or a combination thereof.

17. The UE of claim 1, wherein the set of resources for model training comprises a group-common training resource for simultaneous online training of a respective JED model by multiple UE devices.

18. The UE of claim 1, wherein the first configuration further comprises at least one storage criterion for storing and reporting a trained model, and wherein the at least one processor is configured to cause the UE to:
store the selected JED model based on the at least one storage criterion being satisfied; and
report the selected JED model based on the at least one storage criterion being satisfied.

19. A method performed by a User Equipment ("UE"), the method comprising:
receiving, from a network device, a first configuration indicating at least one of: a set of resources for model training, a type of intended model training, a type of a model to be used, or a combination thereof;
receiving an indication of a wireless channel condition, wherein the indication comprises an index of a first codebook of predetermined channel condition parameters;
selecting a joint channel equalization and decoding ("JED") model from a second codebook of predefined models based on the indication of the wireless channel condition and the received first configuration; and
training the selected JED model using the first configuration.

20. A processor for wireless communication, comprising:
at least one controller coupled with at least one memory and configured to cause the processor to:
receive, from a network device, a first configuration indicating at least one of: a set of resources for model training, a type of intended model training, a type of the model to be used, or a combination thereof,
receive an indication of a wireless channel condition, wherein the indication comprises an index of a first codebook of predetermined channel condition parameters;
select a joint channel equalization and decoding ("JED") model from a second codebook of predefined models based on the indication of the wireless channel condition and the received first configuration; and
train the selected JED model using the first configuration.

* * * * *